(12) United States Patent
Begelman et al.

(10) Patent No.: US 11,107,445 B2
(45) Date of Patent: Aug. 31, 2021

(54) NETWORK CENTRIC WINDOWING SYSTEM FOR INTEGRATION AND DISPLAY OF VISUAL DATA FROM NETWORKED SOURCES

(71) Applicant: Canon Medical Systems Corporation, Otawara (JP)

(72) Inventors: James Begelman, Vernon Hills, IL (US); Victor Gorin, Vernon Hills, IL (US); Joseph Manak, Vernon Hills, IL (US)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 0 days.

(21) Appl. No.: 16/570,731

(22) Filed: Sep. 13, 2019

(65) Prior Publication Data

US 2021/0082374 A1    Mar. 18, 2021

(51) Int. Cl.
| | |
|---|---|
| *G09G 5/373* | (2006.01) |
| *G06T 11/00* | (2006.01) |
| *G06T 3/60* | (2006.01) |
| *G09G 5/06* | (2006.01) |
| *G06T 3/40* | (2006.01) |

(52) U.S. Cl.
CPC ............... *G09G 5/373* (2013.01); *G06T 3/40* (2013.01); *G06T 3/60* (2013.01); *G06T 11/00* (2013.01); *G09G 5/06* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2007/0057940 A1 | 3/2007 | Petschnigg et al. | |
| 2007/0279436 A1 | 12/2007 | Ng et al. | |
| 2011/0164029 A1 | 7/2011 | King et al. | |
| 2012/0005269 A1* | 1/2012 | Janssen | G06F 3/0481 709/203 |
| 2013/0132466 A1 | 5/2013 | Miller et al. | |
| 2013/0205239 A1* | 8/2013 | Holland | G06F 9/451 715/766 |
| 2016/0342313 A1* | 11/2016 | Gross | G06F 3/1415 |

* cited by examiner

*Primary Examiner* — Vu Nguyen
(74) *Attorney, Agent, or Firm* — Oblon, McClelland, Maier & Neustadt, L.L.P.

(57) ABSTRACT

A system, method and computer readable medium to render, as a single image, source data from a network of data providers, that provide source data of a respective data type. A composition space contains two-dimensional (2D) display surfaces to which the source data is provided from the data providers, and transformation operator surfaces, which are located at different positions in a depth direction than the 2D display surfaces. Each of the transformation operator surfaces represent a respective visual transformation operation on surfaces of the 2D display surfaces that are positioned at lesser depths than the transformation operator surface. Using data-centric communication, updates are published to the 2D display surfaces, the updates including the source data from the data providers, and, upon detecting an update to a subscribed 2D display surface, the subscribed 2D display surface is rendered as the single image by performing the visual transformation operations.

20 Claims, 19 Drawing Sheets

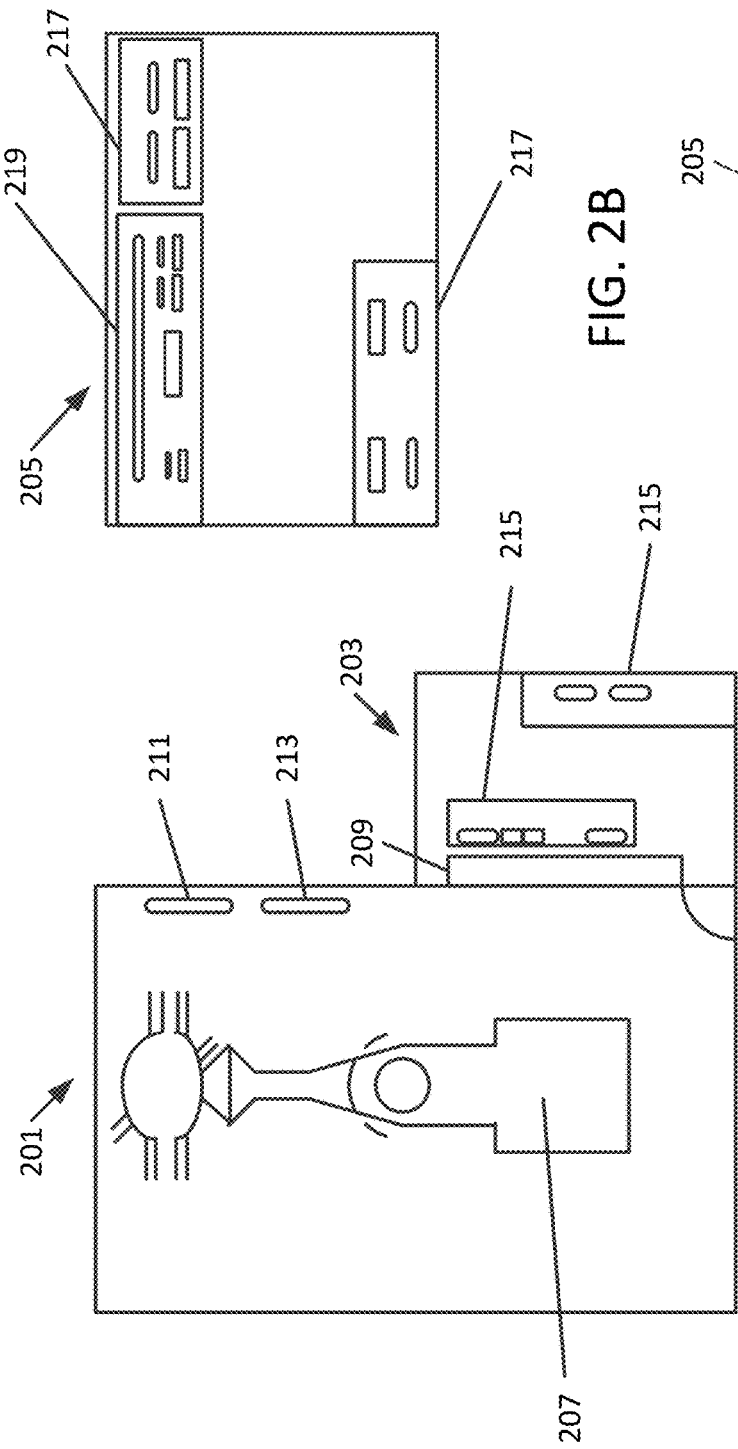
FIG. 2A
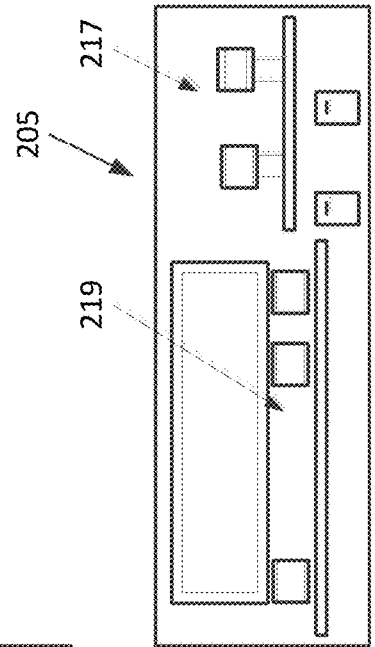
FIG. 2B
FIG. 2C

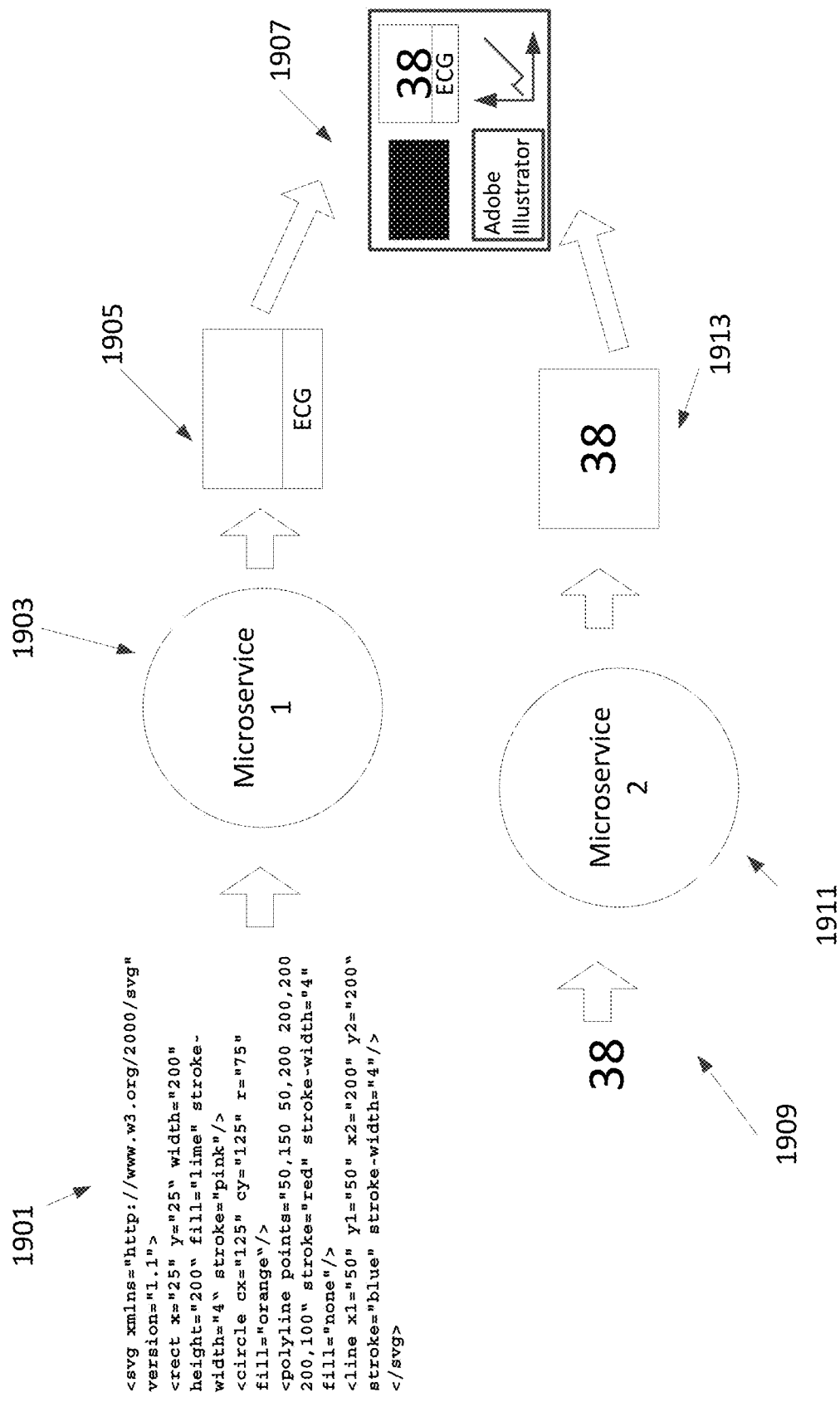

NETWORK CENTRIC WINDOWING SYSTEM FOR INTEGRATION AND DISPLAY OF VISUAL DATA FROM NETWORKED SOURCES

FIELD

The present disclosure relates generally to a distributed windowing system having a network-centric architecture in which all hosts share a graphics state and components are coupled with data-centric communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Information-based facilities may include various types of measuring devices and output devices, where each output device may output different information. Examples of types of output devices may include devices that output vector graphics, devices that output images, devices that output telemetry data, devices that output lists of scalar values, devices that output time series data and devices that output waveform signals. Various types of measuring devices and output devices may be produced by different vendors. The output devices may be monitored by several individuals, each of which may be interested in specific information that is output by the output devices.

An example of an information-based facility is a medical suite, and in particular, a medical suite for performing interventional procedures. Medical suites may include various types of medical equipment and display devices necessary for interventional procedures. Interventional procedures involve cooperative needs of various clinical roles, where each clinical role relies on information output from one or more medical devices. FIG. 1 is a diagram for clinical roles that may be involved in interventional procedures. Clinical roles may include radiologist role 101, cardiologist role 102, anesthesiologist role 103, technologist 104, nurse role 105, 106, and imaging physicist 107. An interventional procedure generally involves making a cut or a hole to gain access to the inside of a patient's body, such as interventional cardiology. Suites where interventional procedures are performed generally include disparate medical devices that output information at multiple locations simultaneously, in real time, and with different configurations. For example, cardiologists and anaesthesiologists may view different information on different displays during the same interventional procedure: fluoroscopy for the cardiologist and vital signs/anaesthetic-agent usage for the anaesthesiologist. Some clinical roles may require viewing of information output from more than one medical device.

Historically, consolidating only relevant information to each clinical role has been complicated by poor hardware/software integration of multi-vendor medical equipment producing the output. As an example, vendors of devices typically assume their output is presented on a dedicated display device. Also each display device may contain only a subset of the information required by a clinical role. Furthermore, output devices outputting information required by multiple individuals may be positioned inconveniently due to space constraints within the suite.

One approach to this usability problem has been to route equipment display output through a video distribution system. Video distribution systems typically combine multiple device outputs into a single output that is fed to a larger, higher-resolution display (or multiple such displays). However, video distribution systems can be costly and have limited flexibility. Also, video distribution systems only handle video or audio signals; the output cannot be treated as data accessible by software. Further, video distribution systems typically combine and position the entire video output of each device.

There is a need to facilitate viewing of information output from disparate sources and equipment in a computer-controlled facility to efficiently and safely perform procedures. It is preferred that the information be presented simultaneously, in real time, to multiple individuals and locations within the facility. There is a need for each individual to be able to control the presentation of the information, including the data's visual appearance and configuration. There is a need for a platform that can be easily expanded for new sources and equipment, and easily set up in different facilities having different sources and equipment.

Accordingly, it is one object of the present disclosure to provide a system, method and computer readable storage medium to display configuration changes that are independent of device vendors or software applications whose output is being presented. It is another object of the present disclosure to integrate output from new or third-party equipment and/or software that requires little or no development effort.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A, 2B, 2C is an example arrangement of a medical suite for performing an interventional procedure;

FIG. 19 is a flow diagram illustrating combination of microservices in accordance with an exemplary aspect of the disclosure.

DETAILED DESCRIPTION OF THE PREFERRED EMBODIMENTS

Figure 1:
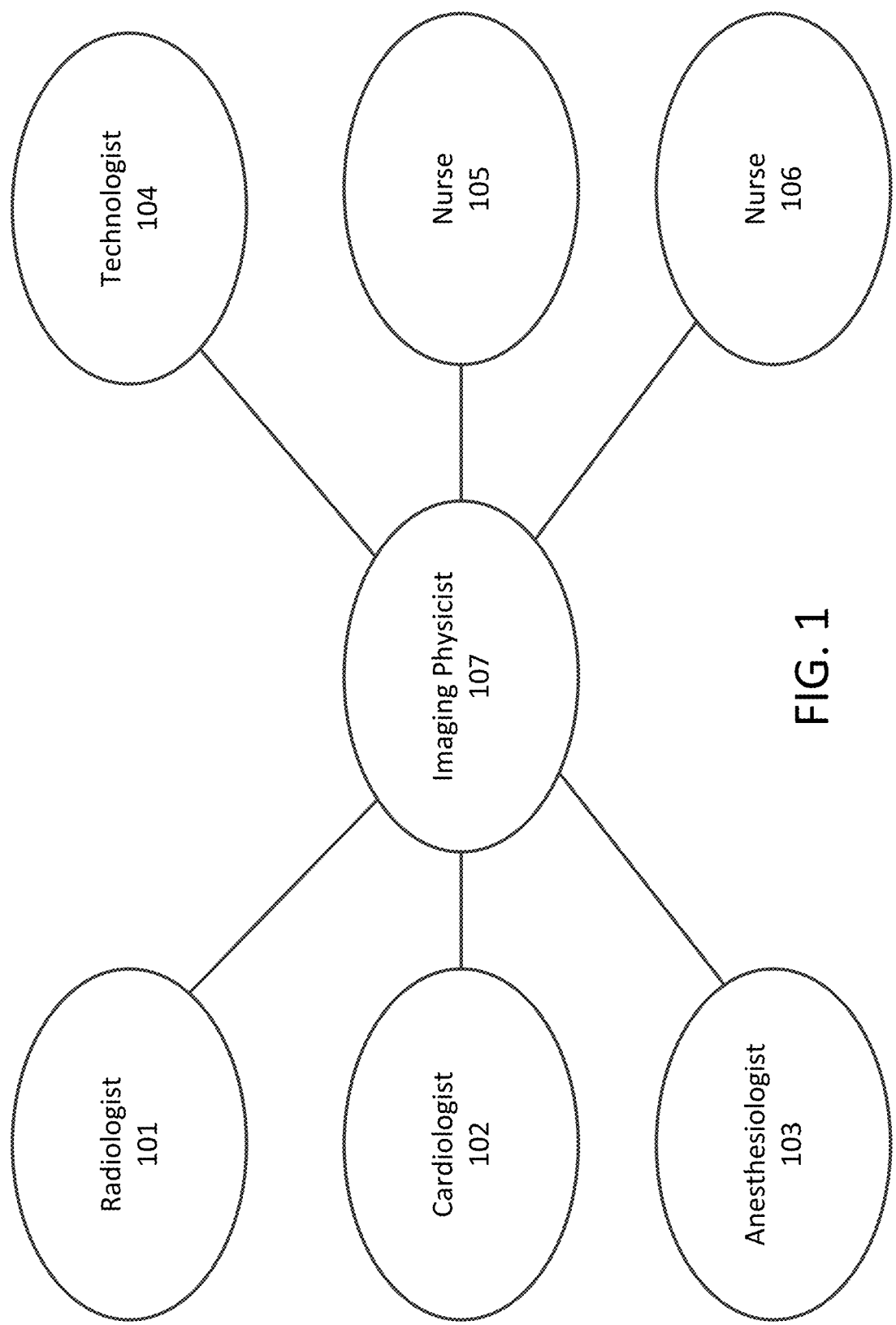
FIG. 1 is a diagram for clinical roles that may be involved in interventional procedures.

Referring now to the drawings, wherein like reference numerals designate identical or corresponding parts throughout the several views.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

FIGS. 2A, 2B, 2C show a non-limiting example of an arrangement of a medical imaging suite for performing an interventional procedure. FIG. 2A shows a top view of a room where an interventional procedure may be performed and an adjacent control room. FIG. 2B shows a top view of a remotely located control room. FIG. 2C shows a front view of the control room of FIG. 2B. The example arrangement is provided for purposes of explanation of a computer-controlled facility such as a medical suite. Arrangements are not limited to the arrangement shown in the drawing, nor are the number and types of equipment. A medical imaging suite may include one or more fluoroscopic rooms 201 and an associated control room 203. A fluoroscopic room 201 may include a display device 211 for fluoroscopy for viewing by the cardiologist and a separate display device 213 for vital signs/anaesthetic-agent usage for the anaesthesiologist. The fluoroscopic room 201 may include a fluoroscopic imaging device 207. The associated control room 203 may include a window 209 to the fluoroscopic room 201 and one or more control terminals 215. An auxiliary control room 205 may include one or more display stations 217 and a display station 219 having a large screen display.

Each display device may be connected to a respective computer or may have a built-in computer (which may be referred to as a smart display device). In certain non-limiting embodiments, the display devices 211 and 213 and the display stations 217 and 219 can include both a computer together with a display. In other non-limiting embodiments, the displays and the computer can be separate, such that the computer includes processing circuitry and memory, and the computer(s) is connected to one or more of the display devices 211 and 213 and the display stations 217 and 219, and control the display device 211, display device 213, the display station 217, and/or the display station 219 to display respective images.

Aside from the fluoroscopic imaging device 207, other equipment may include anaesthetic equipment, physiological monitoring equipment, and a medical gas source. The medical imaging suite may further include access to a hospital's information services, which may include scheduling information, medical images, physiological data, and clinical reports to clinicians inside and outside the institution.

Information to be displayed to clinicians may include information from medical devices, as well as environmental information including room temperature, humidity, lighting, and radiation. Information from medical devices may include fluoroscopic images, vital signs including body temperature, pulse rate, respiration rate, blood pressure, medical gas usage.

In order to meet the needs of individuals in a computer-controlled facility such as a medical imaging suite, disclosed embodiments relate to a network-centric, distributed windowing system. In particular, the present disclosure is a high-throughput, low-latency data network connecting multiple host computers where each host computer has graphics presentation capability and is connected to one or more display devices. In some embodiments, the graphics presentation capability may be provided by one or more graphics processing units (GPUs) configured to control one or more displays. In some embodiments, the GPUs may be provided in different arrangements, for example, as integrated processing circuitry with the main computer processing unit (CPU) or as an external dedicated graphics card.

Figure 3:
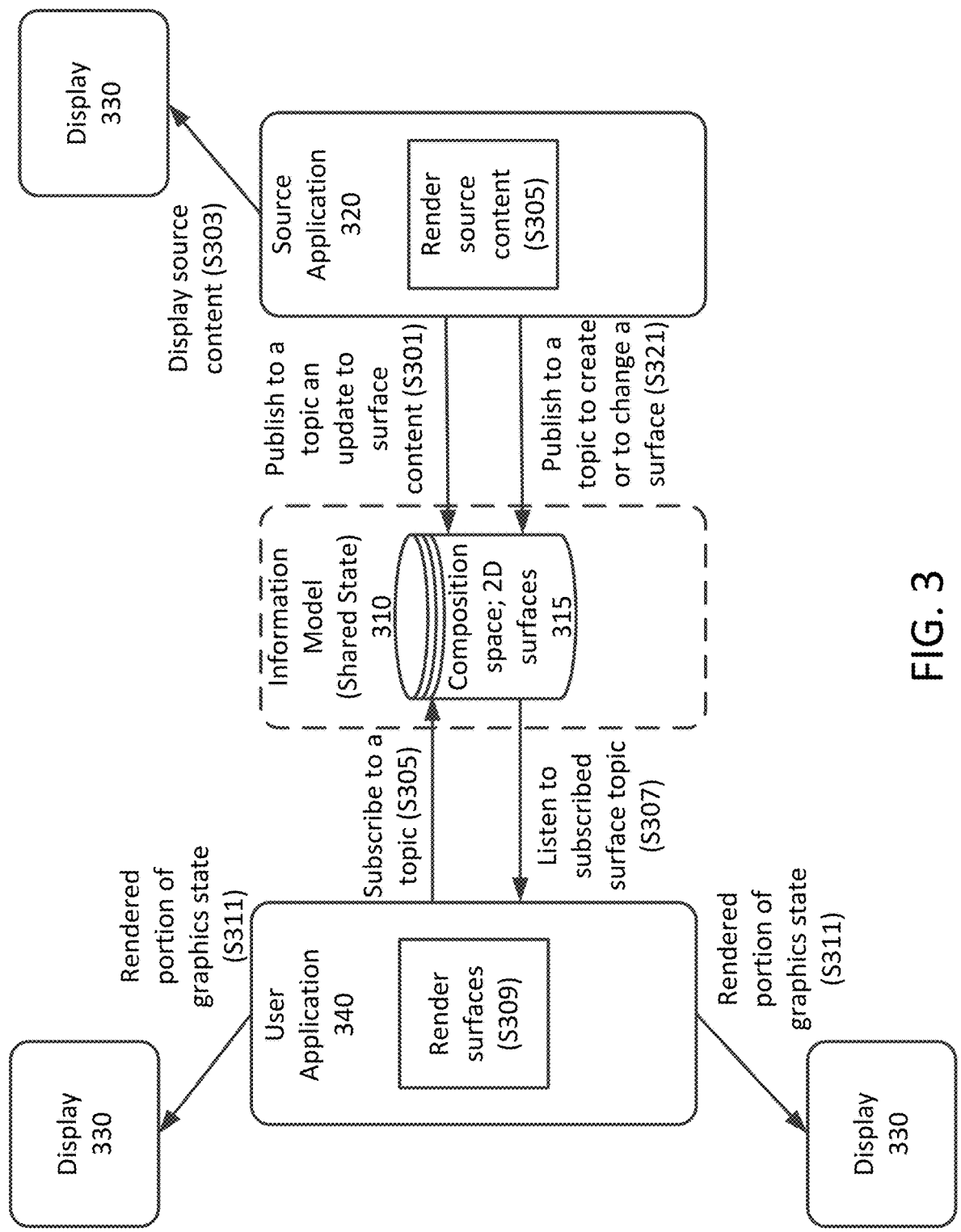
FIG. 3 is a data flow diagram for a network-centric architecture in which user applications and source applications share graphics state over a data network in accordance with an exemplary aspect of the disclosure.

FIG. 3 is a data flow diagram for a network-centric architecture in which software applications, which may include user applications and source applications, share graphics state over a data network in accordance with an exemplary aspect of the disclosure. The network-centric architecture uses data-centric communication supported by a publish-subscribe messaging service. A publish-subscribe messaging service may be a service in which publishers publish messages to topics and subscribers subscribe to topics. In the publish-subscribe messaging service, a subscriber is notified of any message received on a topic. For purposes of this disclosure, a topic pertains to a 3D composition space, which may be associated with a particular information-based facility. In some embodiments, the publish-subscribe messaging service facilitates sharing of a graphics state. The network-centric architecture has a high degree of independence from the underlying physical network and platforms. In addition, the network-centric architecture may include microservices for building data producer services. Microservices are utilities that may be operating in one or more host computers and handle specific individual data types. The individual data types may be consolidated into the shared graphics state. For example, a microservice may build a data producer service that functions as a visualizer for a particular data type. The data producer services are communicating, networked software components, each having specific functional scope, and developmental, operational and managerial independence. The data producer services interact with other components only through communication protocols. More detailed discussion of various data producer services are provided below.

By virtue of the above features, a composition space can be used to combine graphic/visual content information from many different content sources and devices, which potentially use different data types. A composition space is a three-dimensional representation of content from various sources and devices. The composition space may be maintained in a non-volatile memory of one or more host computers. The three-dimensional representation is made up of two-dimensional content which may include display surfaces and transformation surfaces. A display surface is a two-dimensional array of display data, for example pixel values, stored in the non-volatile memory. The disparate graphic/visual information can be combined into a single composite image which can be rendered and displayed (in whole or in part) at various display devices, computer monitors, and display devices connected to work stations of a work environment (e.g., a medical suit). The respective visual-content/data producer service (e.g., an X-ray fluoroscopy device, EKG device, etc.) can provide visual data to respective display surfaces (also referred to as "canvases" and "canvas surfaces") in a composition space, and the order of the display surfaces is used together with the transformation surfaces (also referred to as "operator surfaces") which contain functions to combine, transform, and render the visual data from the disparate content sources into an integrated, composite image. Thus, the composition space has the advantageous effect of providing a single unified image that can be displayed as visual content from many content sources, which are generally considered to be incompatible sources that use incompatible data types. Furthermore, the single unified image can be continuously updated to express real-time changes recorded by the disparate content sources.

Regarding FIG. 3, the network-centric software architecture includes an information model that facilitates sharing of the graphics state over the data network. The information model 310 contains a 3D composition space for a topic having one or more 2D display surfaces 315. Source applications 320 or user applications 320 may publish messages to the topic, S321, to make changes to layout of 2D surfaces, for example, to create, delete, reposition, or resize 2D surfaces, and may be referred to as topic messages. Source applications 320 update 2D surfaces by publishing a content update message to the topic, and may be referred to as a content update message. Provide such an arrangement, source applications 320 can update contents of 2D surfaces, using content update messages, without information about the layout of the 2D surfaces and composition space. For ease of understanding, the information model 310 is described using the non-limiting example of a single 3D composition space 315. The information model 310, however, may in general include more than one 3D composition space, each identified by a respective topic. Source applications 320 include functions for changing the graphics state in the information model 310 via data-centric communication, including, in S301, publish a message to update one or more 2D display surface content 315. In S303, source applications 320 may display their specific content directly to a display device 330. In a data-centric communication manner in which a source application 320 does not directly communicate with a user application 340, in S305, a user application 340 may subscribe to specific changes that occur in the composition space 315. As changes to content are made in the composition space 315, in S307, the user application 340 may listen to a subscribed topic and receive messages regarding changes in content of 2D surfaces of the composition space 315 related to the subscribed topic. In S309, a user application 340 may render those changes in real time. User applications 340 may be configured to, in S311, render any portion of the graphics state and present it on one or more display devices 330. As a non-limiting example, when a specific 2D surface is created by a source application 320 or a user application 340 whose surface identifier is "X", a surface "X" having a particular layout is automatically created by user application 340. Source applications 320 can then update the content of 2D surface "X" by publishing content update messages to topic "X". When updating contents of any 2D surface, the layout of surfaces within composition space remains unaffected.

As will be discussed further below, a user application 340 may also publish changes to layout in the composition space 315. Data-centric communication may occur between different user applications 340, in which user application 340 publishes changes to the layout in the composition space 315 and another user application 340 listens for and renders display images based on the changes to the composition space 315. Also, a user application 340 that publishes changes to the layout in the composition space 315 may be the same user application 340 that renders images based on the changes.

Figure 4:
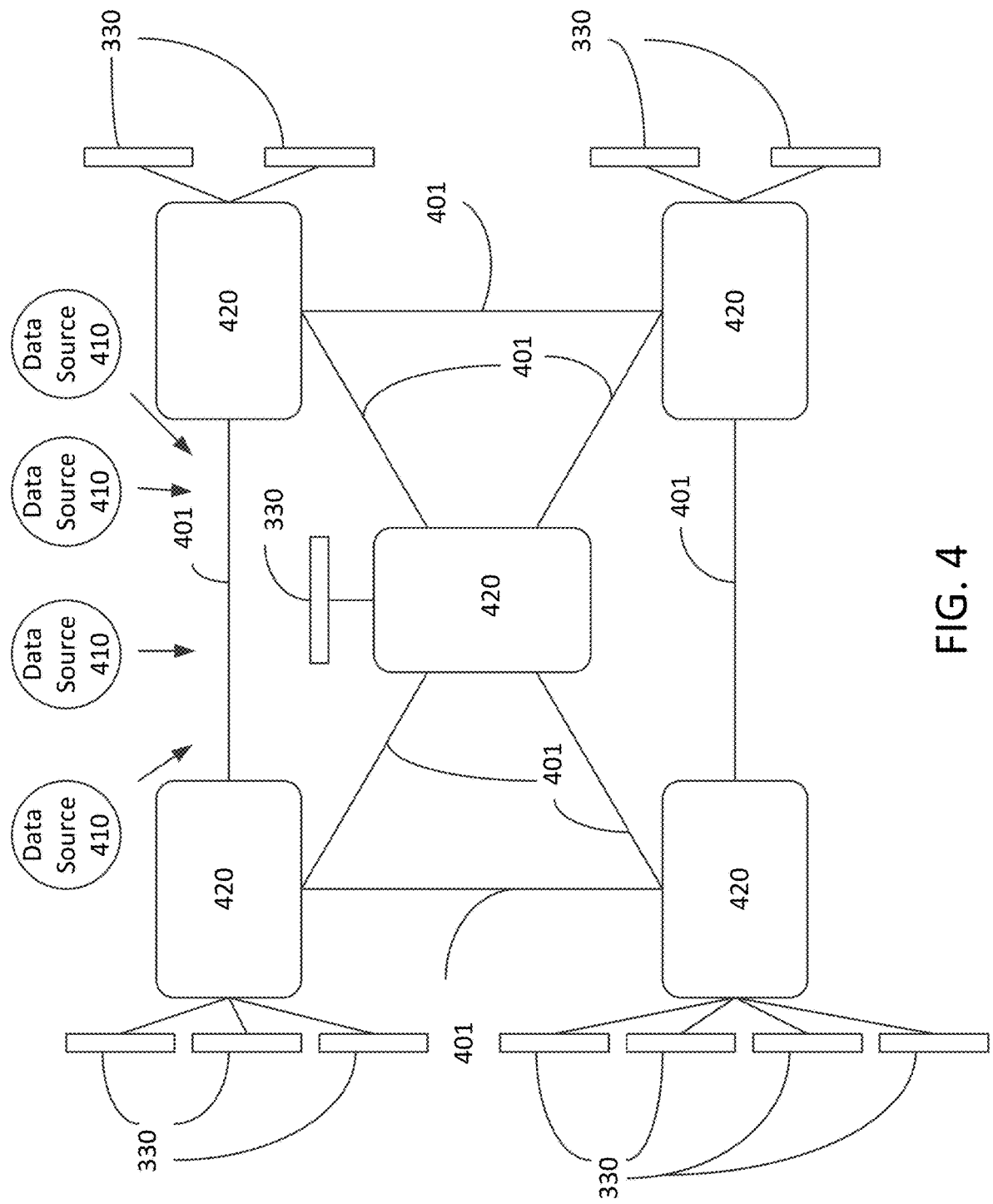
FIG. 4 is a block diagram for a network architecture in accordance with an exemplary aspect of the disclosure.

FIG. 4 is a block diagram for a computer network architecture in accordance with an exemplary aspect of the disclosure. Regarding FIG. 4, the computer network architecture includes a network of connected computers 420, each computer connected to one or more associated display devices 330. As mentioned above, a smart display device 330 may include an embedded computer. The network may connect computers by remote direct memory access (RDMA) 401 over Converged Ethernet, by way of a PCIe based network, or by a wireless connection protocol. Communications between computers is preferably by way of data-centric communication in which the data bus discovers/recognizes and routes data from publishers and to subscribers. Various data output sources 410 may be configured to transmit information output to the network. The data output sources 410 may be connected to one or more of the computers 420 either through a wired connection, such as Universal Serial Bus (USB), serial cable, or the like, or through a wireless connection, such as WiFi, Bluetooth, or other wireless protocol for connecting electronic devices.

Figure 5:
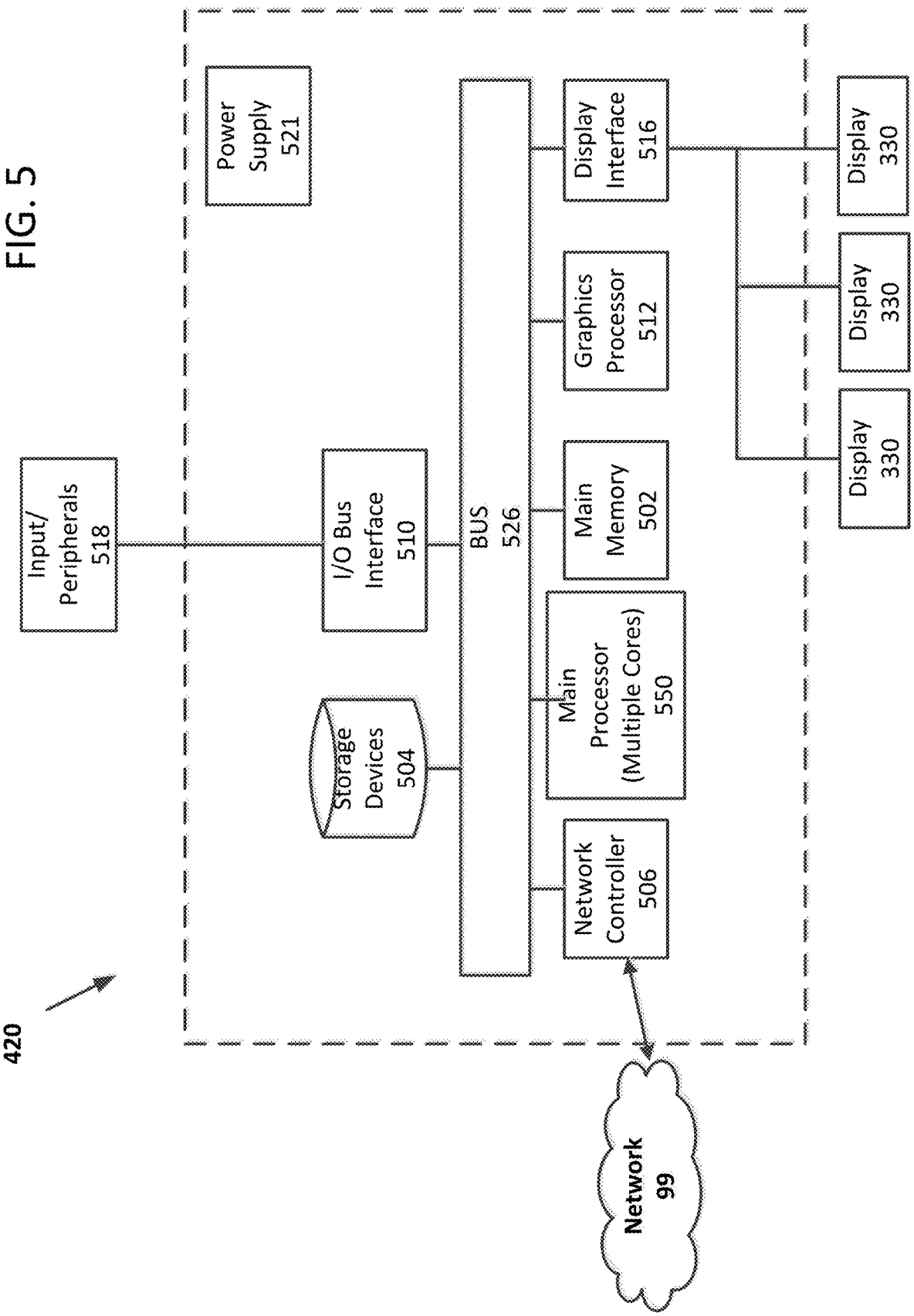
FIG. 5 is a block diagram for a computer system in accordance with an exemplary aspect of the disclosure.

FIG. 5 is a block diagram for a computer system of a computer in the computer network of FIG. 4. The block diagram in FIG. 5 is provided for purposes of explanation of disclosed embodiments. However, disclosed embodiments are not limited to the configuration shown in FIG. 5. Computers 420 of the network architecture of FIG. 4 may have differences in configuration, such as the type of main processor, and type of graphics processor. The computers 420 may have various numbers and types of display devices attached. Alternatively, a computer 420 may be embedded in a display device. Also, the components shown in FIG. 5 are by way of example. Some components may be omitted, other components may be added.

Regarding FIG. 5, the computer system may be a workstation running a server operating system, for example Windows Server, a version of Unix OS, or Mac OS Server, or may be a desktop/laptop computer running a desktop operating system, for example a version of Windows, Linux, or MacOS. Each computer 420 may include processing circuitry that executes a software application 320 and/or 340. In some embodiments, an application 320, 340 may be implemented as circuitry or firmware. The computer system 500 may include a main processor 550 (also referred to as processing circuitry) having one or more processing cores and a graphics processor 512. Main processors may include processor families of x86, x64, ARM, PowerPC, and SPARC. The graphics processor 512 (e.g., processing circuitry) may perform many of the graphics operations of disclosed embodiments and preferably can support the number of display devices that are connected to the computer system. Examples of graphics processors include integrated GPUs, AMD GPUs such as AMD Radeon™ GPUs, and NVIDIA GPUs such as NVIDIA Quadro® or GeForce® GPUs. The computer system 500 includes main memory 502, typically random access memory RAM, which contains the software being executed by the processing circuitry, including processing cores 550 and graphics processor 512, as well as a non-volatile storage device 504 for storing data and the software application. For example the main memory 502 and/or the non-volatile storage device 504 can store instructions that when executed cause the computers 420 and/or display(s) 330 to perform various of the steps and processes illustrated in FIGS. 3, 6, and 17. Several interfaces for interacting with the computer system 500 may be provided, including an I/O Bus Interface 510, Input/Peripherals 518 such as a keyboard, touch pad, mouse, Display Interface 516 and one or more Display devices 330, and a Network Controller 506 to enable wired or wireless communication through a network 99. The interfaces, memory and processors may communicate over the system bus 526. The computer system 500 includes a power supply 521, which may be a redundant power supply.

Data-centric communication between software applications 320, 340 and composition space 315 over the computer network of FIG. 4 may be performed by middleware, such as RTI® Connext™ DDS. The middleware may provide a data distribution service (DDS) that complies with the Object Management Group® DDS. User Applications 340 and Source Applications 320 may communicate by reading and writing to shared data objects, which are cached in each computer 420. The middleware may provide the data-centric framework for distributing, synchronizing and managing data communicated between User Applications 340 and Source Applications 320. The middleware may also handle other management services such as load balancing, workload distribution and transaction processing.

In some embodiments, the User Applications 340 may be supplemented with data producer services for handling specific data types of content. Specific data types of content may include text content in Web pages, scalable vector graphics (SVG) or other vector graphics, images from medical devices, such as a DICOM byte stream, telemetry from medical devices such as HL7 messages, a sequence of scalar values, time series data, and waveform signals. As mentioned above, each data producer service (as made by a microservice) is a communicating, networked software component, having specific functional scope, and developmental, operational and managerial independence. These characteristics allow the network-centric architecture to evolve. Independent operation may include dynamic discovery of topics that are in use, dynamic discovery of application data types associated with a topic, and rendering of the discovered application data types. The microservice may be used to make a data producer service by selecting a topic and a data type to visualize.

Figure 6:
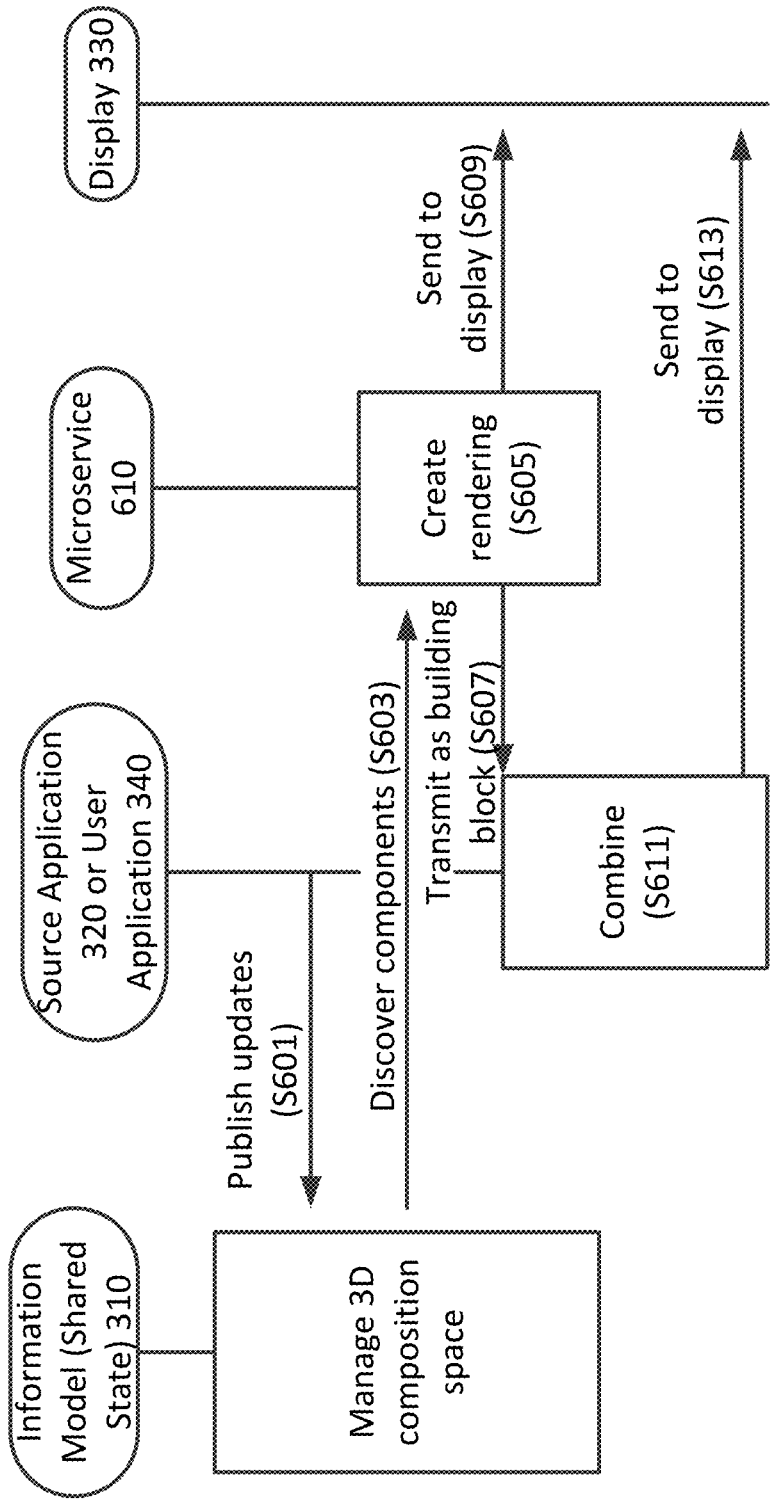
FIG. 6 is a sequence diagram for a network-centric architecture in accordance with an exemplary aspect of the disclosure.

Data producer services are described in more detail with respect to FIG. 6. Although FIG. 6 shows a single data producer service made by a microservice, an aspect of the present disclosure is a set of microservices, in which each data producer service created by a microservice handles visualization of a single data type. Each data producer service uses data-centric communication to dynamically discover active topics. For a discovered topic, the data producer service may then dynamically discover the data type that the data producer service handles and that is being exchanged for an active topic. FIG. 6 is a sequence diagram for a network-centric system architecture with respect to a microservice in accordance with an exemplary aspect of the disclosure. As previously mentioned, communication in the network-centric system architecture is in accordance with a publish-subscribe communications model. Regarding FIG. 6, in S601, a source application 320 being executed by processing circuitry 550, 512 of a computer 420 publishes updates to graphic data in the shared 3D composition space 315. In S603, a data producer service made by the microservice 610 and executed by processing circuitry 550, 512 dynamically discovers topics in which updates are being made. For a topic for which updates are being made, the data producer service discovers the data types of application data. In some embodiments, data types may be discovered based on file type extension, such as .html, .svg, or may be identified by examining the content in the date file or stream, or in some cases by examining header data. The data producer service, executed by processing circuitry 550, 512, selects a specific topic and data type handled by the data producer service to render. In S605, the data producer service, executed by processing circuitry 550, 512, may create a rendering of the data type. In S607, the rendered data type may be transmitted by processing circuitry 550, 512 as a block to be combined, in S611, with renderings for other data types for composite display, S613. In S609, the rendering may be transmitted by processing circuitry 550, 512 directly to a display device 330.

Thus, source applications 320 may render data types into 2D surfaces and user application 340 may render the 2D surfaces for display with the aid of a data producer service while executing on processing circuitry 550, 512. In some embodiments, the user application 340 may also be executed by processing circuitry 550, 512 to render these data types directly. Each surface in composition space may be assigned a type id. The type id may be used by user application 340 to interpret the contents of the 2D surface in order to render it. For example, if a 2D surface 315 has type id HTML, a user application 340 may be executed by processing circuitry 550, 512 ri render the HTML based on the type id into a graphical representation (e.g. a web page) and display it. The source application 320 may also be executed by processing circuitry 550, 512 to update the 2D surface by publishing HTML text to that 2D surface.

In some embodiments, a topic may be a single composition space of all data associated with a facility, such as a medical imaging suite. An aspect is a 3D composition space maintained in at least one memory 504 that facilitates data-centric communication between user applications 340 and between user applications 340 and source applications 320 being executed on processing circuitry 550, 512 of host computer systems 420. In some embodiments, the 3D composition space may be managed by the above-mentioned middleware in a manner that each software application 320, 340 has access to a copy of the 3D composition space 315.

Figure 7:
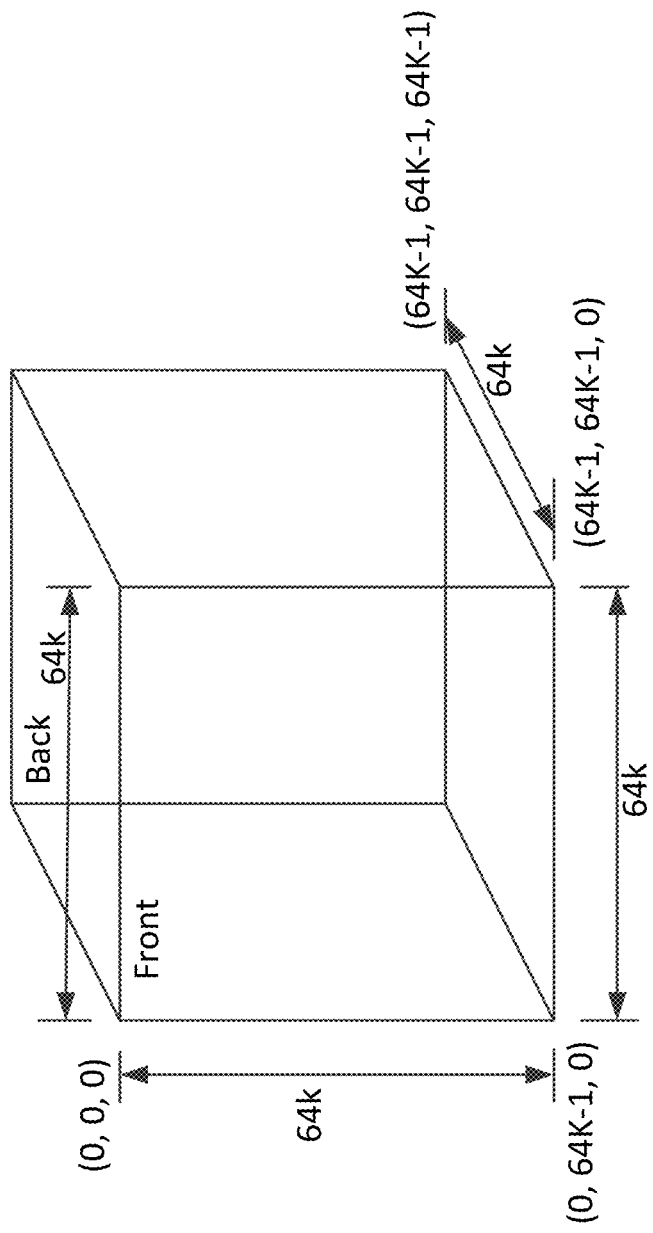
FIG. 7 is a diagram illustrating a 3D composition space in accordance with an exemplary aspect of the disclosure.
Figure 7:
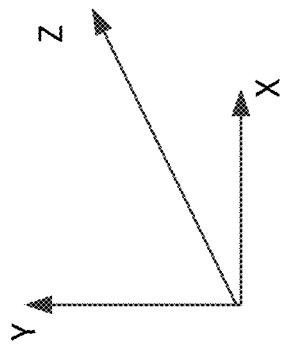

FIG. 7 is a diagram illustrating a non-limiting example of a 3D composition space maintained in at least one memory 504 in accordance with an illustrative aspect of the disclosure. The 3D composition space may be a shared graphics state stored in memory 504 that includes at least one 2D display surface located at a position along a depth (Z) direction. The dimensions of 2D display surfaces may be less than or equal to the dimensions of the X-Y plane in the 3D composition space. The dimensions of the X-Y plane may be defined in accordance with expected dimensions of a largest display device 330, or may be set arbitrarily large. As shown in FIG. 5, the composition space is represented as 64K×64K pixels. Current physical displays may include HD display (1280×720), Full HD (1920×1080), 4K (3840×2160), 8K (7680×4320). Thus, a dimension of 64K by 64K is an example dimension suitable for long term expansion to future display devices. Also, the 3D composition space preferably includes sufficient depth to accommodate a number of 2D display surfaces to meet the needs of equipment in a computer-controlled facility, such as a medical imaging suite.

Content of 2D display surfaces is obtained from source applications 320 and may be generated by one or more microservices executing on processing circuitry 550, 512. Original content from content source equipment sources may be a specific data type, such as an image, time series data, sequence data, or waveform signal, or a file type, such as DICOM byte stream, HL7 messages, HTML, or SVG. 2D display surfaces are graphic images such that the 3D composition space represents a shared graphic state. Rendering of 2D display surfaces for display devices is controlled by user applications 340 executing on processing circuitry 550, 512. The 3D composition space maintained in memory 504 facilitates data-centric communication of content from disparate content from various data equipment sources.

Figure 8:
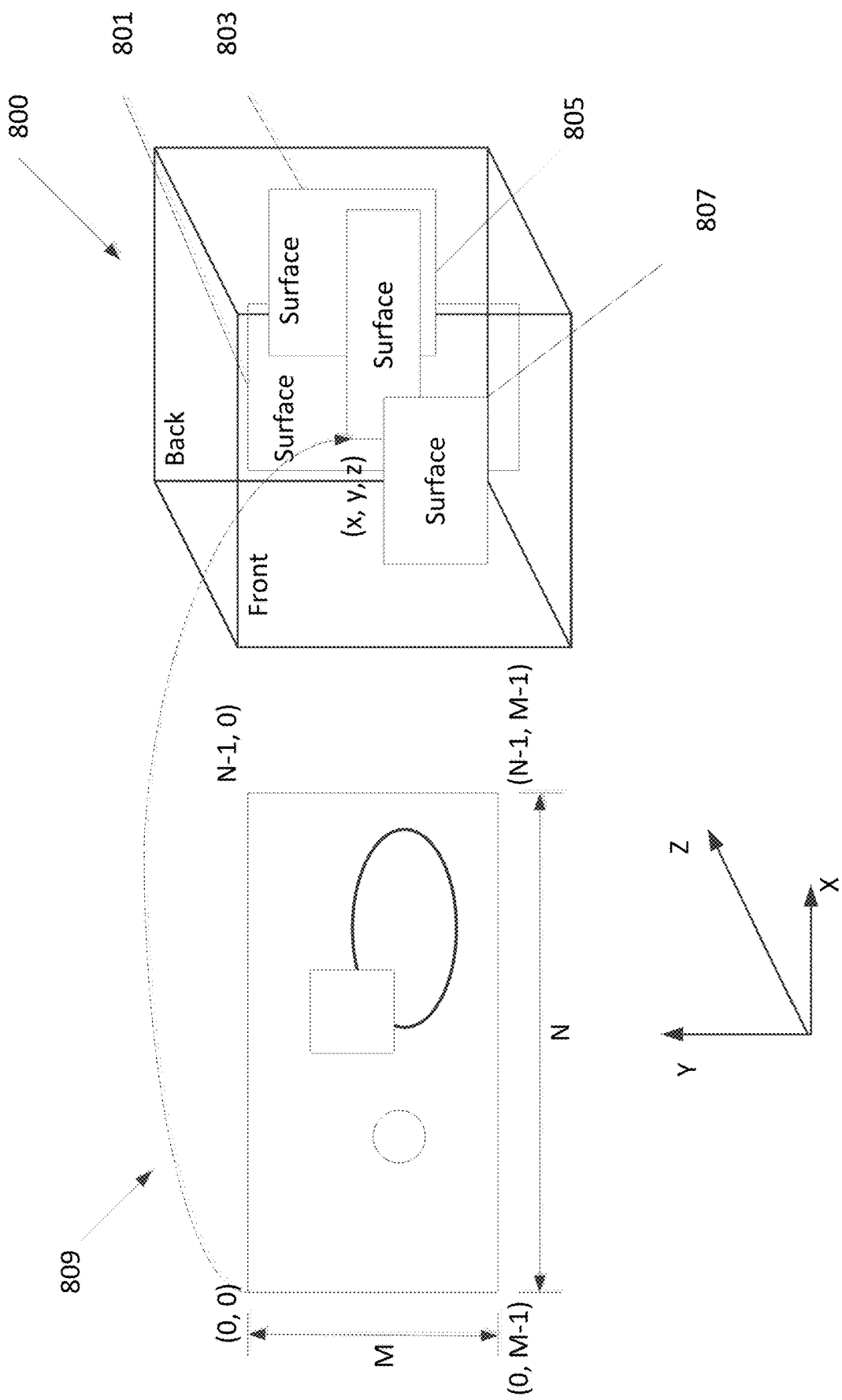
FIG. 8 is a diagram illustrating rendering of display surfaces in accordance with an exemplary aspect of the disclosure.

FIG. 8 is a diagram illustrating an arrangement of 2D display surfaces in the 3D composition space maintained in at least one memory 504 and how the arrangement is rendered in a 2D display surface in accordance with an exemplary aspect of the disclosure. Regarding FIG. 8, 2D display surfaces 801, 803, 805, 807 are stored in memory 504 at positions representing the depth (Z) direction in the 3D composition space 800. When rendered by processing circuitry 550, 512 as a composited two-dimensional image 809, the depth direction positioning has a front to back orientation such that 2D display surfaces in front supersede 2D display surfaces that are positioned behind. Also, the composited image that is rendered by processing circuitry 550, 512 may include a set of 2D display surfaces 805, 807 in accordance with a specific point corresponding to an origin of the composited two-dimensional image 809 (see point x, y, z in FIG. 8) in the 3D composition space 800. Provided this point, 2D display surfaces 801, 803 further back from the specific point in the depth direction are omitted. The two-dimensional extent of the rendered image 809 may be less than the X-Y dimensions of the 3D composition space 800 and may be the dimensions of a particular display device. For example, as shown in FIG. 8, the rendered image 809 has dimensions of N×M pixels which may correspond to the pixels of a particular display device. As noted above, changes to the 3D composition space 800 may be made by way of a source application 320 or user application 340 executing on processing circuitry 550, 512 that communicates changes by publishing messages to the 3D composition space 800 in memory 504, and may include creating, destroying, moving and sizing 2D display surfaces. Movement of a 2D display surface may be performed by changing the location information of the stored surface in an X-Y plane of the composition space 800. Content from content sources may be updated by way of execution of Source Applications 320 which may change content of a 2D display surface.

User applications 340 may include functions for creating visual transformations that perform specific types of transformations on 2D display surfaces. A visual transformation may include operators and parameters to configure the operator's behavior. In one embodiment, the visual transformation may be 2D transformation operator surfaces stored in the 3D composition space in at least one memory 504 at positions representing the depth (Z) direction. When 2D display surfaces include a transformation operator surface, and 2D display surfaces are rendered by a user application 340 executed on processing circuitry 550, 512, operations in a transformation operator surface are applied by the processing circuitry 550, 512 to surfaces in front of the transformation that intersect its X-Y extent. Visual transformations may include composition transformations, stencil transformations, blend (transparency) transformations, and color-substitutions. Other visual transformations include scaling transformations, rotate transformations, decompression transformations, encryption/decryption transformations, and other transformations that may be made to graphic images.

In operation, a user application 340 may position a composition operator surface somewhere in 3D composition space 800 where it will be applied to 2D surfaces. A result of applying the composition operator may represent what would be displayed on a display device 330. The user application 340 may be configured to render displays for respective selected display devices 330 based on selected composition operators. In such case, one composition result of applying composition operators for a first display would be for one display, and another composition result would be for a second display.

In operation, when a 3D composition space 800 and 2D display surfaces within it are much larger than can be mapped to a single display device additional configuration information may be specified. In particular, additional configuration information that specifies how the display region should intersect the 3D composition surface 800 may be specified. The intersection information may be specified in a number of ways; for example, using a configuration file:"Y": display-1: (128, 128), where the region of surface "Y" on display-1: [left, right, top, bottom]=[128, 128, 128+monitor-width−1, 128+monitor-height−1].

Figure 9:
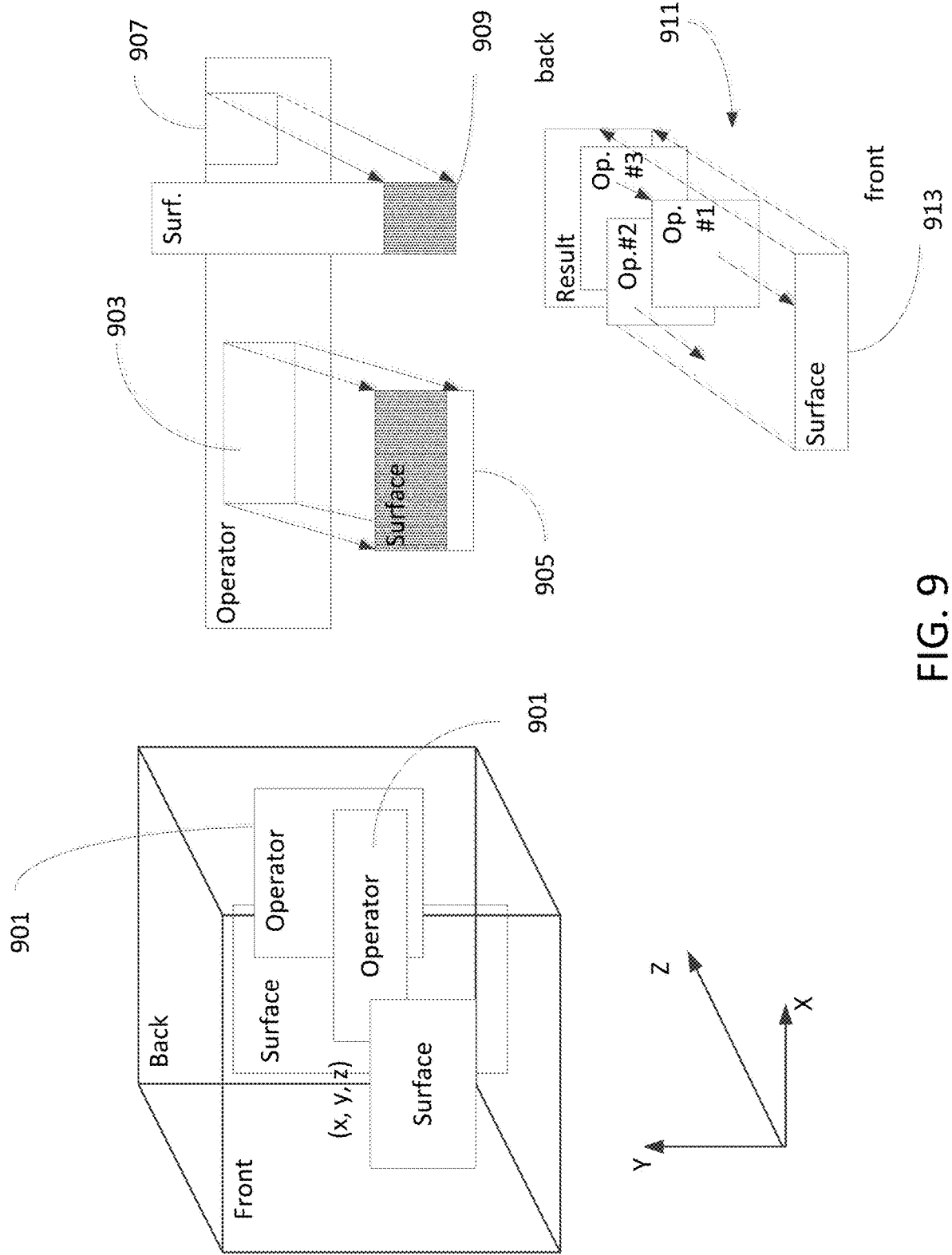
FIG. 9 is a diagram illustrating transformation operator surfaces within the 3D composition space in accordance with an exemplary aspect of the disclosure.

FIG. 9 is a diagram illustrating application of transformation operator surfaces within the 3D composition space in accordance with an exemplary aspect of the disclosure. Transformation operator surfaces are preferably represented in the 3D composition space as respective transformation operator surfaces 901, each having an extent in the X-Y directions. Transformation operator surfaces 903, 907 may be arranged such that respective operators are applied by processing circuitry 550, 512 only to the intersection between the operator and an extent of surfaces 905, 909 directly in front of the operator (i.e., overlapping regions that have the same X-Y coordinate). In addition, transformation operator surfaces 911 (Op. #1, Op. #2, Op. #3) may be arranged such that operators are applied to a 2D display surface 913 in an order of front to back in the depth direction in the 3D composition space (e.g., order of Op. #1, Op. #2, Op. #3 in FIG. 9).

Figure 10:
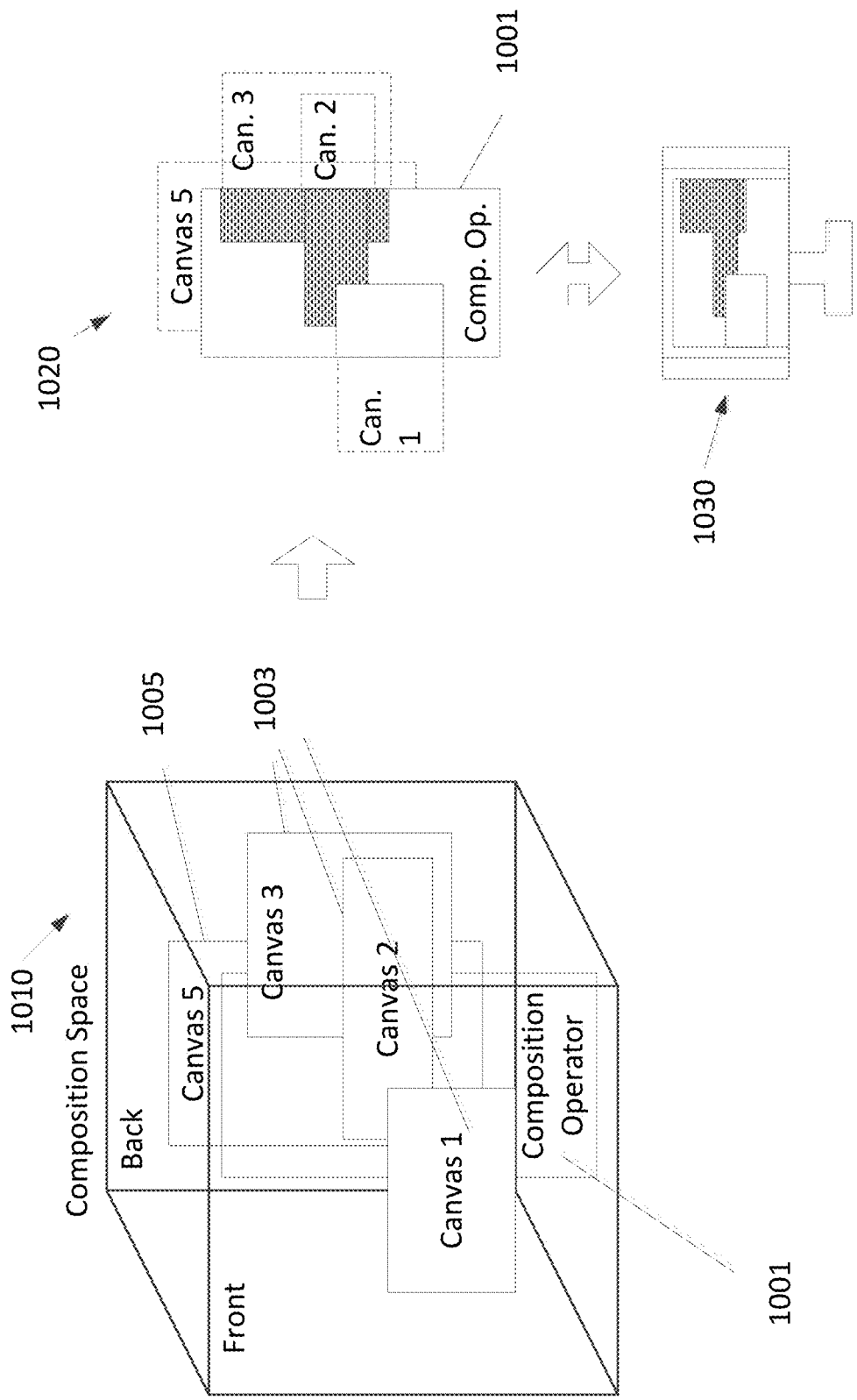
FIG. 10 is a diagram illustrating transformation operator surfaces for compositing 2D display surfaces, clipping, and rendering in accordance with an exemplary aspect of the disclosure.

In some embodiments, each computer 420 may be configured to perform several built-in transformation operators for routine types of transformations. A user may designate a position and extent of a transformation operator surface using the built-in transformation operators by way of an executing user application 340. FIG. 10 is a diagram illustrating a composition transformation in accordance with a non-limiting example of the disclosure. A composition transformation surface 1001 involves an operator that defines an X-Y extent boundary that one or more canvases are to be rendered. In this disclosure, the term canvas is used interchangeably with 2D display surface. As with any transformation operator surface, operations by the operator apply to canvas surfaces that are in front of the transformation operator surface (toward the front most surface of the 3D composition space), while canvas surfaces that are behind the transformation operator surface will not be subject to the operation.

The transformation operators may be pre-existing operators that are included in each computer 420 and performed during image rendering, or may be previously composited images to be rendered by a software application.

In addition to being updated, 2D surface contents may be read by any application such as source application 320. For example, an application like that of source application 320 may be executed by processing circuitry 550, 512 to publish a message to 2D surface, say "Y", to request its contents. If "Y" happens to be a composition operator surface then the application request is handled by the processing circuitry 550, 512 as a "screenshot" of the 2D surfaces that overlay and intersect "Y". Further, the content in 2D surfaces may be read for other purposes. For example, the content in one or more 2D surfaces may be rendered by processing circuitry 550, 512 into a format suitable for printing (e.g., PDF, PS, PCL, etc.).

Regarding FIG. 10, execution of a composition operator 1001 in composition space 1010 will apply a composition operation on canvas surfaces 1003 and will not apply a composition operation on canvas surface 1005. A composition operation 1020 by execution of an operator in a composition operator surface 1001 will perform a clipping operation to the canvas surfaces 1, 2, 3 (1003) in front of the composition operator surface 1001. Each canvas surface 1003 is clipped to the extent defined by the composition operator surface 1001. The clipped surfaces are rendered by processing circuitry 550, 512 and displayed in a composited 2D image 1030.

Figure 11:
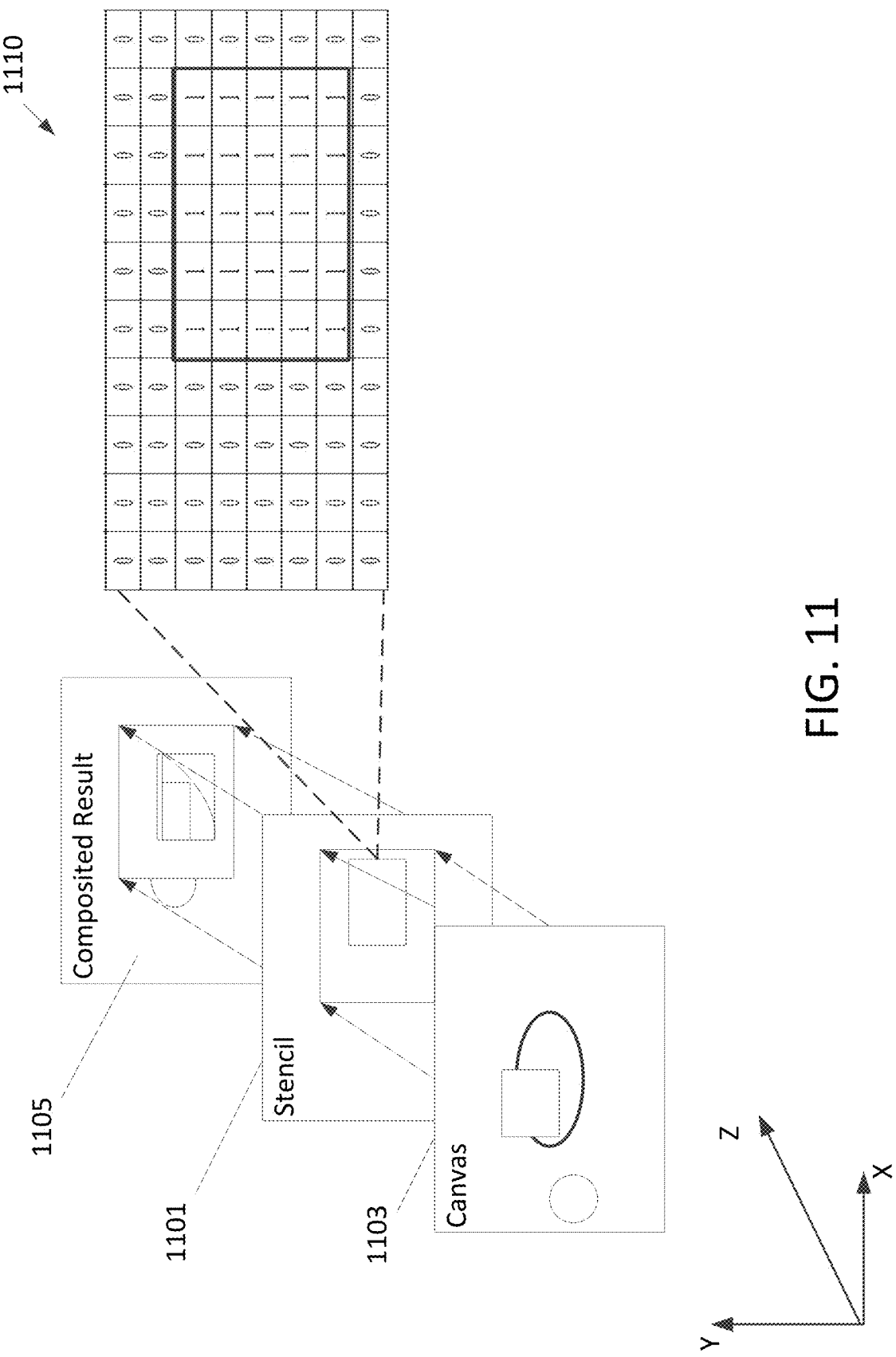
FIG. 11 is a diagram illustrating a stencil transformation in accordance with an exemplary aspect of the disclosure.

FIG. 11 is a diagram illustrating a stencil transformation in accordance with a non-limiting example of the disclosure. Execution of a stencil operator by processing circuitry 550, 512 transforms a pixel in a canvas surface based on a value for a corresponding pixel in a stencil surface. For example, a stencil surface content 1110 may contain a matrix of stencil values for each pixel, where a value of zero (0) means the corresponding pixel in a canvas will not be rendered and a value of one (1) means the corresponding pixel in a canvas will be rendered. Stencil transformation surface 1101 may be applied to a canvas surface 1103 to obtain a composited image 1105. Stencil values in a stencil transformation surface 1101 may be applied to more than one canvas surface 1103 in front of the stencil surface. It is preferred that the area of a stencil transformation surface 1101 be at least as large as the area of the canvas surface(s) 1103 that the stencil transformation surface 1101 is to be applied. However, in a case that a stencil transformation surface 1101 is smaller in area than a canvas surface 1103, i.e., has fewer stencil values than the number of corresponding pixels in a canvas surface, pixels of the canvas surface 1103 that do not have a corresponding stencil value may have a default stencil value of zero.

Figure 12:
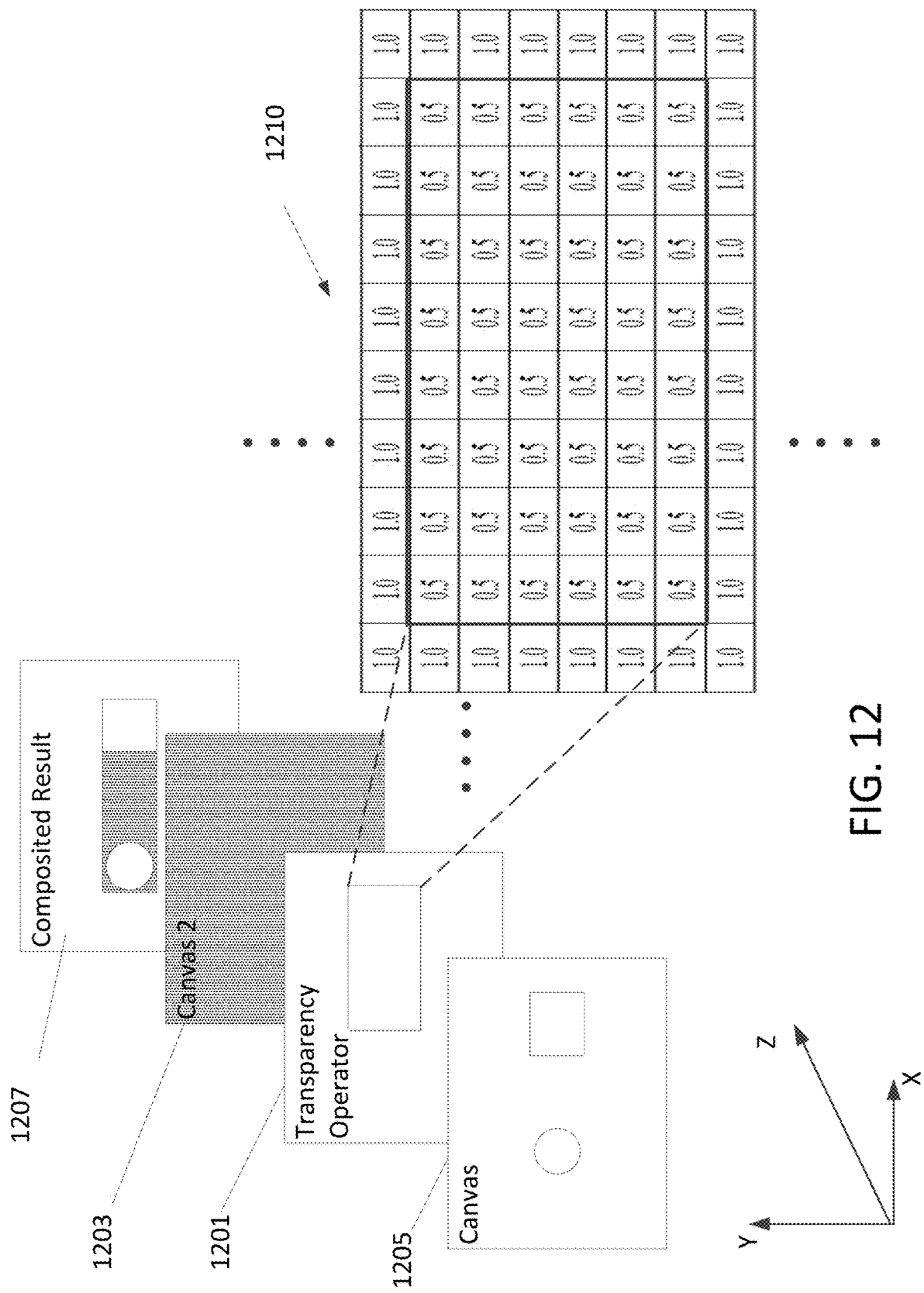
FIG. 12 is a diagram illustrating a blending transformation in accordance with an exemplary aspect of the disclosure.

FIG. 12 is a diagram illustrating a blending transformation in accordance with a non-limiting example of the disclosure. Similar to the stencil operator, a blending transformation surface defines values for corresponding pixels. In the case of a blending operator, the blending value can be a decimal value from 0.0 to 1.0, where a value of zero (0.0) is transparent (i.e., does not change the value of the corresponding canvas pixel) and a value of one (1.0) is opaque (i.e., blocks the value of the corresponding canvas pixel). In operation, the blending operator values are applied by processing circuitry 550, 512 to corresponding pixels of a blend surface. In the blending transformation, one or more canvas surfaces 1205 in front of a blending transformation surface 1201 will have their corresponding pixel values changed based on application of blending operator values 1210 in blending transformation surface 1201 to the corresponding pixel values in blend surface 1203. The blending operator values may be applied by multiplying by processing circuitry 550, 512 the blending operator values 1210 with corresponding pixel values in blend surface 1203. In such case, multiplying a pixel value of a blend surface 1203 by 0.0 results in transparent pixel value that has no effect on a corresponding pixel value of a canvas 1205 pixel. Multiplying a pixel value of a blend surface 1203 by 1.0 results in blocking the corresponding pixel value of a canvas 1205 pixel. A pixel value of a blend surface 1203 multiplied by a value between 0.0 and 1.0 (e.g., 0.5) will result in blending of semi-transparent value of the blend surface 1203 and the corresponding pixel value of a canvas 1205 to obtain a composited image 1207.

Figure 13:
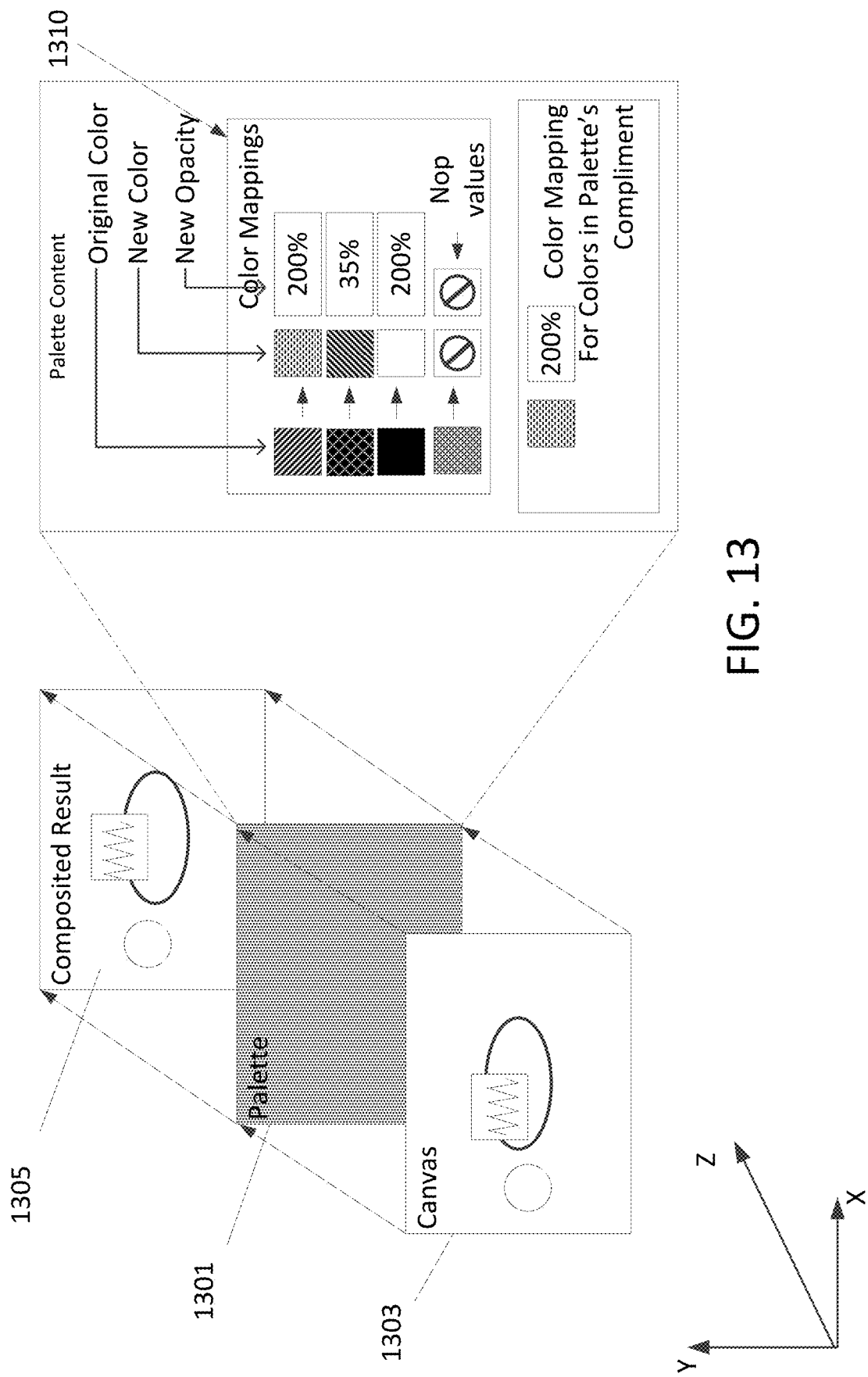
FIG. 13 is a diagram illustrating a color-substitution transformation in accordance with an exemplary aspect of the disclosure.

FIG. 13 is a diagram illustrating a color-substitution transformation in accordance with a non-limiting example of the disclosure. Instead of blending, colors in a canvas may be changed to a new color using a color mapping between an original color and a new color. A color substitution transformation surface 1301 may include a color mapping 1310 that may be used to change color values to new colors and new opacities in a canvas 1303 to colors for a composited image 1305. The color substitution transformation surface 1301 may change the color values and opacities of all canvas 1303 surfaces in front of the color substitution transformation surface 1301 based on the color mapping.

Provided the network-centric system architecture of the present disclosure, a user, such as a clinician, may easily control the presentation of information from disparate sources, including the data's visual appearance and configuration. Different portions of the 3D composition space 315 may be arbitrarily moved and sized for rendering for particular display devices 330. Arbitrary combinations of operations by transformation operator surfaces may be applied by processing circuitry 550, 512 to 2D display surfaces to render portions of the 3D composition space. Portions of a 3D composition space may be rendered by processing circuitry 550, 512 in a coordinated fashion for display as a larger image on a group of display devices. Thus, presentation of information from disparate sources can be tailored to the needs of a particular group of users, so that each user is provided with the information that they need for a particular procedure. The presentation of information may be re-configured to conform to the number and roles of users.

Figure 14:
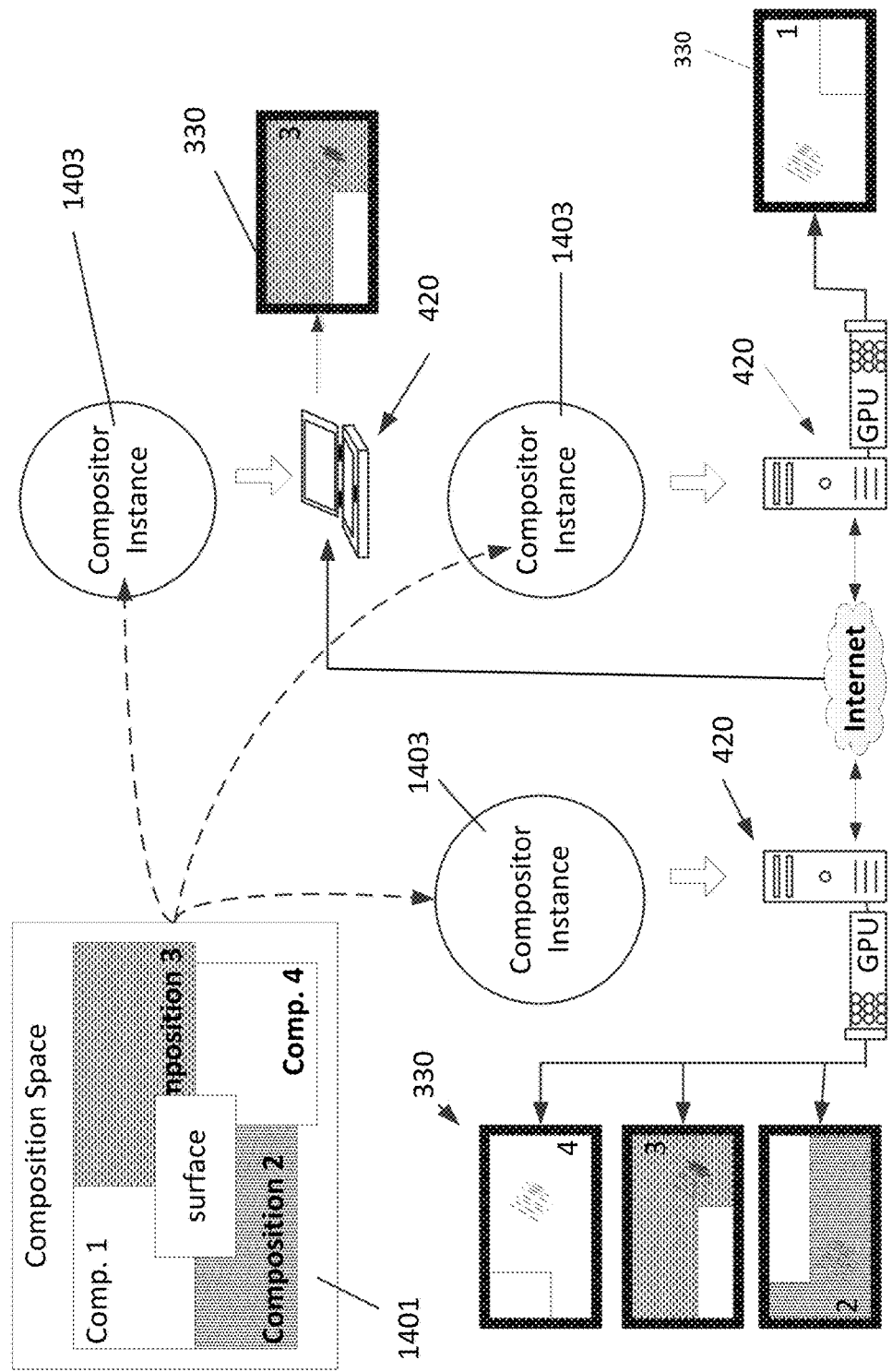
FIG. 14 is a diagram illustrating transformation operator surfaces for rendering portions of the 3D composition space for different displays in accordance with an exemplary aspect of the disclosure.

FIG. 14 is a diagram illustrating composition operators for rendering respective portions of the 3D composition space for different displays in accordance with a non-limiting example of the disclosure. User applications 340 of the network-centric system architecture may be provided with control over the 3D composition space 1401 so that particular content may be rendered by processing circuitry 550, 512 for one or more particular display devices 330 connected to respective computers 420. Each user application 1403 may be provided with control over movement and size of a composition transformation surface in order to display a portion of the 3D composition space 1401 that is needed at a respective display device 330.

Figure 15:
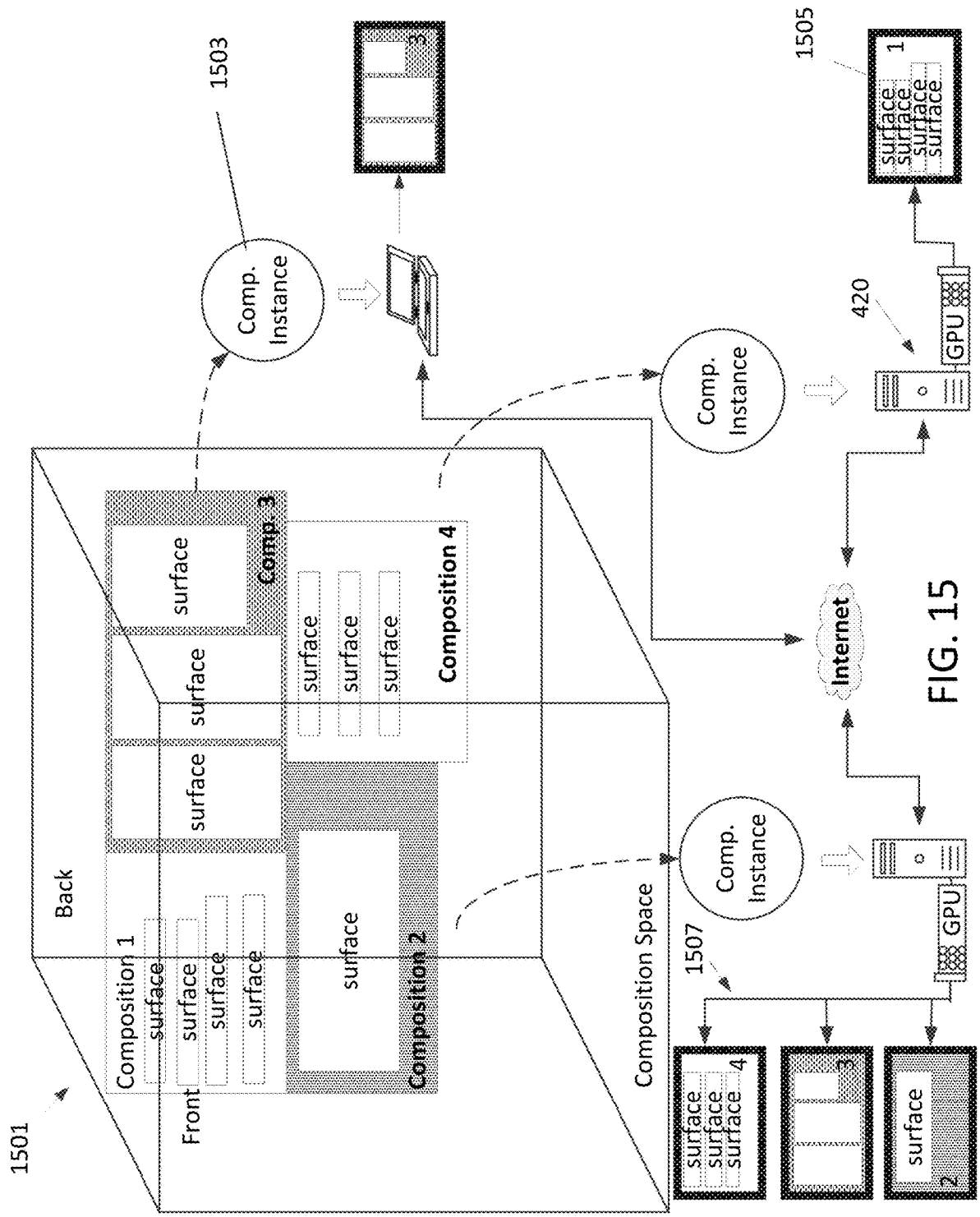
FIG. 15 is a diagram illustrating combination of transformation operator surfaces for different displays in accordance with an exemplary aspect of the disclosure.

FIG. 15 is a diagram illustrating rendering surfaces for different display devices using different combinations of transformations in accordance with a non-limiting example of the disclosure. In one aspect, each user application may render results of a different combination of transformation operators at each computer 420. For example, user application 1503 may render by processing circuitry 550, 512 results of transformation operator 3, user application 1505 may render by processing circuitry 550, 512 result of transformation operator 1, and user application 1507 may render by processing circuitry 550, 512 results of transformation operators 2, 3 and 4.

Figure 16:
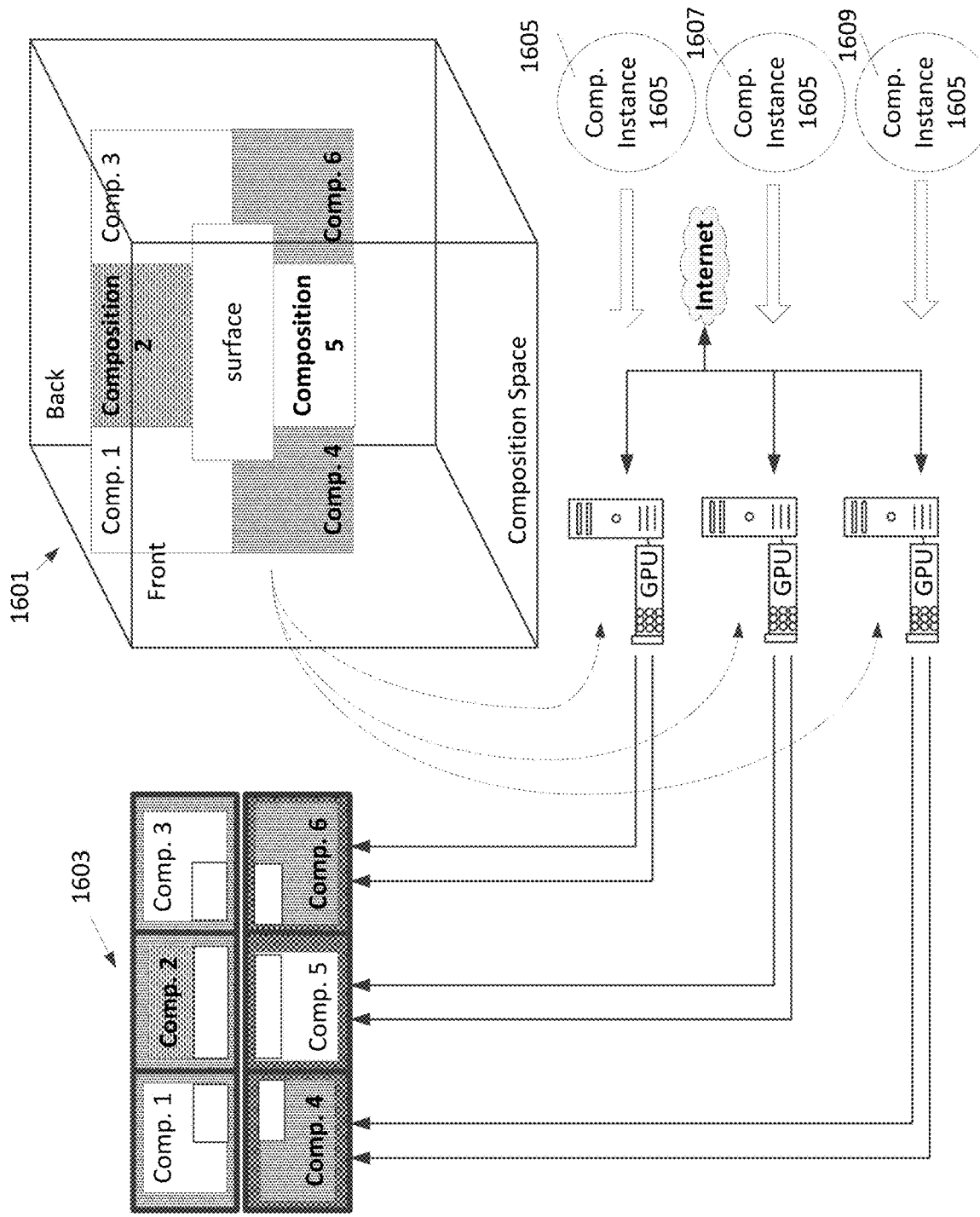
FIG. 16 is a diagram illustrating combination of rendered transformation operator surfaces in accordance with an exemplary aspect of the disclosure.

FIG. 16 is a diagram illustrating combination of rendered transformation operator surfaces in accordance with a non-limiting example of the disclosure. In one aspect, several display devices may be interconnected to provide a large common display device 1603. Several user applications may control particular display devices. For example, user application 1605 may render by processing circuitry 550, 512 display images based on applying composition transformation operators 3 and 6 of composition space 1601. User application 1607 may render by processing circuitry 550, 512 display images based on applying composition transformation operators 2 and 5 of composition space 1601. User application 1609 may render by processing circuitry 550, 512 display images based on applying composition transformation operators 1 and 4 of composition space 1601. Images rendered by each user application constitute a combined image displayed over a group of six display devices.

The network-centric system architecture is able to interpret and visualize high-level application data. The network-centric system architecture is able to visualize the application data exchanged over the network between participants. The network-centric system architecture is independent of new participants and various types of data that participants publish. These characteristics are accomplished by applications that are able to detect the various data types, select particular data types, interpret and render a particular data type, and produce a composite of various selected data types.

Figure 17:
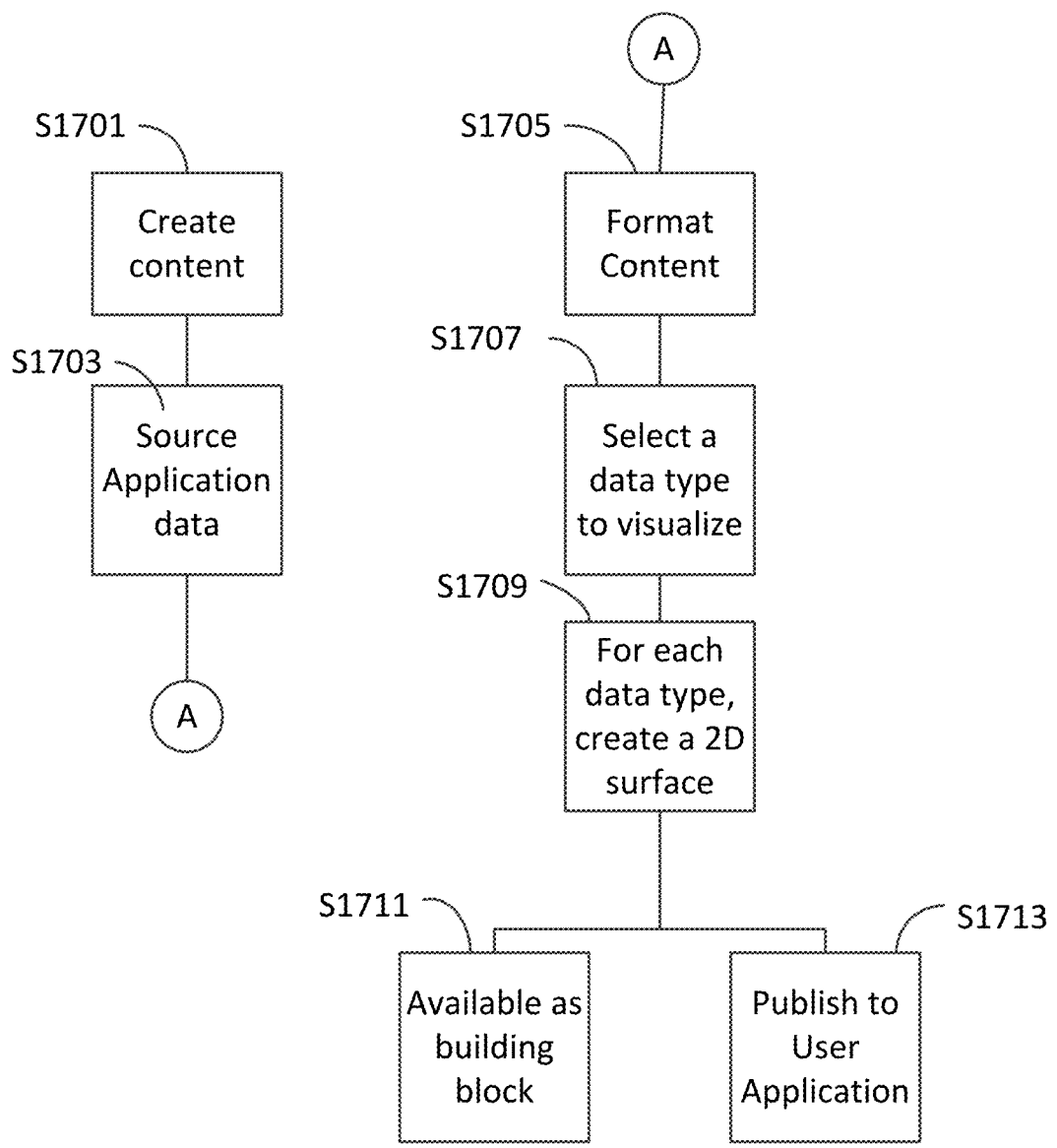
FIG. 17 is a flowchart for microservices in accordance with an exemplary aspect of the disclosure.

FIG. 17 is a flowchart for microservices in accordance with an exemplary aspect of the disclosure. As mentioned above, a 2D display surface may contain a specific data type, such as an image, time series data, sequence data, or waveform signal, or a file type, such as Digital Imaging and Communications in Medicine (DICOM) byte stream, Health Level 7 (HL7) messages, HTML, or SVG. These data types may originate from various sources such as various types of medical instrument devices, such as medical measurement instruments. Some data types may be clinical data that may originate from central medical databases or external sources located outside of a medical facility. The microservices are executed by processing circuitry 550, 512. In S1701, content associated with a content source may be created using a content creativity tool executing on processing circuitry 550, 512. In S1703, an executing source application 320 may receive the content data and, in S1705, may perform conversion or formatting of the content from the content source. In S1707, a microservice, for example for SVG, may detect content that has been converted to SVG and may render the SVG as an image, for example a pixmap, and in S1709, store the image as a 2D display surface. For example, the content may be converted to an SVG, JPG, or GIF image. In S1713, an executing user application 340 may publish one or more converted images as a composited image. In S1711, the converted image may be a 2D display surface that is available for use as a building block by a user application.

Figure 18:
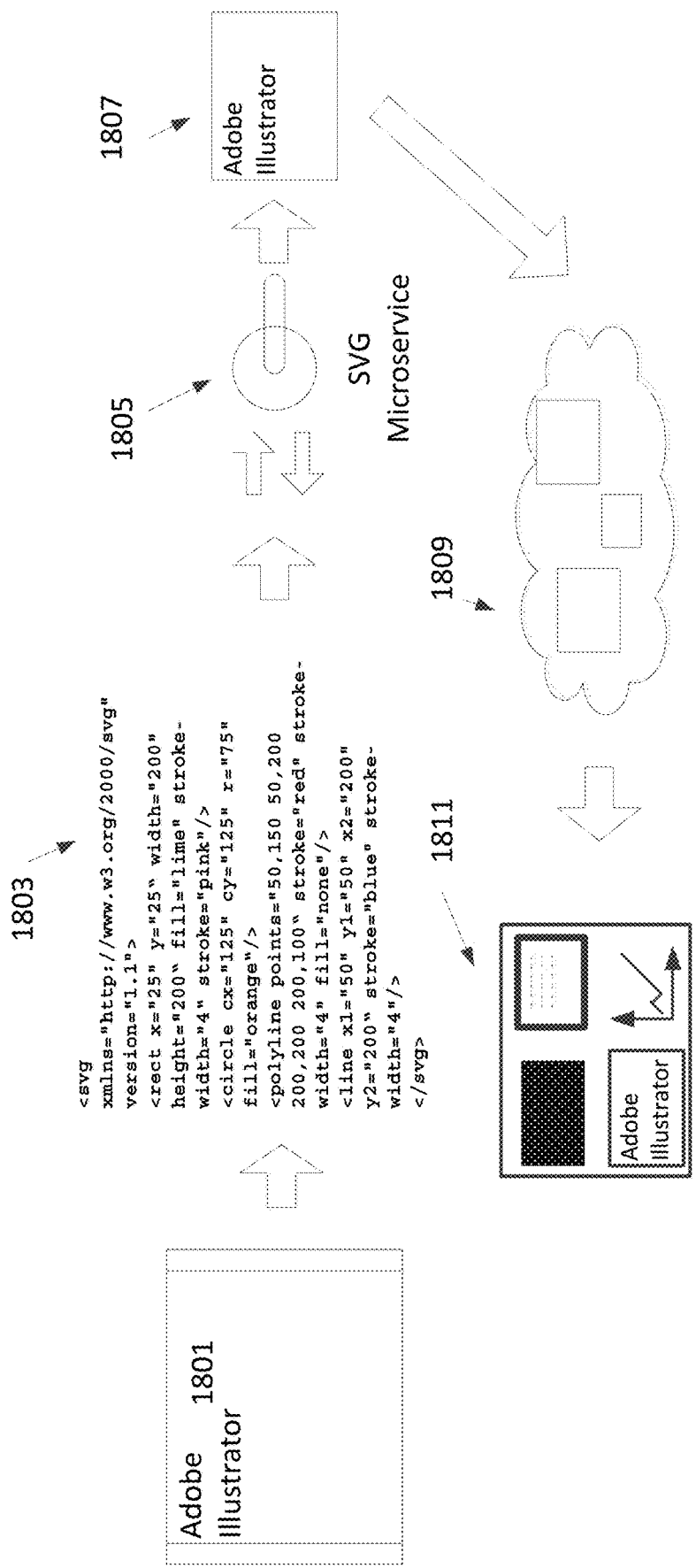
FIG. 18 is a flow diagram for a microservice in accordance with an exemplary aspect of the disclosure.

FIG. 18 is a flow diagram for a microservice in accordance with an exemplary aspect of the disclosure. FIG. 18 illustrates an example of the steps of FIG. 17. In 1801, an application such as a creativity tool may be used to create some graphical content (for example, Adobe® Illustrator may be used to create some static UI content). In 1803, the content may be saved in memory 504 as a SVG file. In 1805, the SVG file may be sent to an SVG microservice. In 1807, the SVG microservice renders the SVG into a bitmap image. An executing user application 340 may create one or more transformations and publish the bitmap image as a 2D display surface and the one or more transformations as transformation operator surfaces to the 3D composition space. Alternatively, executing user application 340 may construct a 2D display surface that combines several images from the microservice and may publish the composited image 1809. In some embodiments, the SVG microservice does not have to publish any composition transformations; they may pre-exist in composition space as noted. When publication occurs, any user applications subscribed to the 3D composition space will re-composite the scene and display the changes on their local display devices. The combined effect is to "display SVG text" directly. An executing user application 340 may render the composited image for display 1811.

FIG. 19 is a flow diagram illustrating multiple microservices in accordance with an exemplary aspect of the disclosure. FIG. 19 provides an example of multiple microservices that executed in combination produce a complex display image. In the example, ECG heart rate (a scalar value) and its decorative label (an SVG script) are composed into a display for a patient vital sign. In particular, in 1901, an SVG script may be created for an ECG label. An executing microservice 1903 that handles SVG data type may use the SVG script to convert the label content into an image 1905. In 1909, an integer value obtained from a heart rate monitor may be received by a source application 320. An executing microservice 1911 that handles scalar data may convert the integer value into an image 1913. An executing user application 340 may combine images from the microservices into a composited image 1907.

Numerous modifications and variations of the present invention are possible in light of the above teachings. It is therefore to be understood that within the scope of the appended claims, the invention may be practiced otherwise than as specifically described herein.

What is claimed is:
1. A system for rendering, as a single image, source data from a network of data providers, the system comprising:
   at least one display device; and
   a computer having processing circuitry and a memory, wherein the memory maintains a composition space, the composition space containing
two-dimensional (2D) display surfaces to which the source data is provided from the data providers, and
at least one transformation operator surface, which is located at a different position in a depth direction than the 2D display surfaces, the at least one transformation operator surface representing a respective visual transformation operation on surfaces of the 2D display surfaces that are positioned at lesser depths than the transformation operator surface, wherein at least one of the 2D display surfaces is positioned at a greater depth than the transformation operator surface, and not subject to the visual transformation operation, and
the processing circuitry is configured to
publish, to subscribers, an update to at least one of the 2D display surfaces within the composition space, the update including the source data from at least one of the data providers being provided to the at least one of the 2D display surfaces,
subscribe to the at least one of the 2D display surfaces,
upon detecting an update to a subscribed 2D display surface,
render the at least one subscribed 2D display surface as the single image by performing the at least one visual transformation operation on the at least one subscribed 2D display surface when the subscribed 2D display surface is positioned at the lesser depth, and
choose the single image, and
the at least one display device is configured to display the single image.

2. The system of claim 1, wherein the processing circuitry is further configured to publish the update by at least one of creating, destroying, and/or changing properties of the at least one 2D display surface within the composition space.

3. The system of claim 1, wherein
the processing circuitry is further configured to publish the update by updating graphic data of the at least one of the 2D display surfaces based on the source data from the at least one of the data providers, and
the graphic data is updated independently from properties of the at least one 2D display surface.

4. The system of claim 1, wherein the processing circuitry is further configured to perform the at least one visual transformation operation, wherein the at least one visual transformation operation includes one or more of
applying initial placement and dimension to selected ones of the 2D display surfaces,
compositing the selected ones of the 2D display surfaces,
clipping the selected ones of the 2D display surface,
rendering graphic data in the selected ones of the 2D display surfaces based on a stencil,
blending pixels in a graphic image based on a blend transformation,
substituting color values of a graphic image based on a color mapping,
scaling the selected ones of the 2D display surfaces,
rotating the selected ones of the 2D display surfaces, and/or
compressing or decompressing the selected ones of the 2D display surfaces.

5. The system of claim 1, wherein
the memory maintains the composition space such that the depth direction of the composition space includes a front surface and a rear surface, and the 2D display surfaces are located at positions between the front surface and the rear surface, and
the processing circuitry is further configured to
render the at least one subscribed 2D display surface such that frontward surfaces of the 2D display surfaces, which are toward the front surface, supersede rearward surfaces of the 2D display surfaces, which are toward the rear surface having greater depths in the depth direction than the frontward surfaces, and
render the at least one subscribed 2D display surface as the single image without performing the at least one visual transformation operation on the at least one subscribed 2D display surface when the subscribed 2D display surface is positioned at the greater depth than the transformation operator surface.

6. The system of claim 5, wherein
the memory maintains the at least one transformation operator such that the at least one transformation operator surface is a 2D surface of operators, and
the processing circuitry is further configured to apply the operators as transformation functions to 2D display surfaces that are frontward of the 2D surface of operators at the intersection of the 2D surface of operators and the forward 2D display surfaces.

7. The system of claim 6, wherein
the memory maintains the composition space such that the composition space includes a plurality of 2D operator surfaces, and
the processing circuitry is further configured to apply a selected combination of the plurality of 2D operator surfaces as a combination of transformation functions to 2D display surfaces forward of the combination of the plurality of 2D operator surfaces.

8. The system of claim 7, wherein the processing circuitry is further configured to apply the combination of transformation functions to the forward 2D display surfaces in an order of the 2D operator surfaces from the rear surface to the front surface.

9. A system for rendering, as a single image, source data from a network of data providers, the system comprising:
at least one display device; and
a computer having processing circuitry and a memory, wherein
the memory maintains a composition space, the composition space containing
two-dimensional (2D) display surfaces to which the source data is provided from the data providers, and
at least one transformation operator surface, which is located at a different position in a depth direction than the 2D display surfaces, the at least one transformation operator surface representing a respective visual transformation operation on surfaces of the 2D display surfaces that are positioned at lesser depths than the transformation operator surface, and
the processing circuitry is configured to
publish, to subscribers, an update to at least one of the 2D display surfaces within the composition space, the update including the source data from at least one of the data providers being provided to the at least one of the 2D display surfaces,
subscribe to the at least one of the 2D display surfaces,
upon detecting an update to a subscribed 2D display surface, render the at least one subscribed 2D display surface as the single image by performing the at least one visual transformation operation on the at least one 2D display surface and choose the single image, and the at least one display device is configured to display the single image, wherein the processing circuitry is further configured to publish, to the subscribers, the update including the source data from the at least one of the data providers, including:

receiving the source data from the at least one of the data providers as data of a respective data type, the data types received from the data providers including one or more of text, vector graphics, byte stream, compressed or uncompressed video, medical device data, time series, waveform, electronic patient records, and vital-signs, detecting a respective data type of the source data received from at least one of the data providers, the respective data type being one of the one or more data types, and rendering a part of the source data to the subscribed 2D display surface into an image by converting the respective data type of the source data into a data type of the image.

10. The system of claim 9, wherein the processing circuitry is further configured to publish, to subscribers, the update including the source data from the at least one of the data providers, including:

receiving the source data of the respective data type in a respective predefined format obtained from an instrument source, and rendering the part of the source data to the subscribed 2D display surface into the image by converting the source data in the respective predefined format into the data type of the image.

11. A method for rendering, as a single image, source data from a network of data providers, wherein the method is performed in a system having processing circuitry and a memory, the method comprising:

maintaining, in the memory, a composition space containing two-dimensional (2D) display surfaces to which the source data is provided from the data providers, and at least one transformation operator surface located at a different position in a depth direction than the 2D display surfaces, the at least one transformation operator surface representing a respective visual transformation operation on 2D display surfaces positioned at lesser depths than the transformation operator surface, wherein at least one of the 2D display surfaces is positioned at a greater depth than the transformation operator surface and not subject to the visual transformation operation;

publishing, to subscribers by the processor circuitry, an update to at least one of the 2D display surfaces within the composition space, the update including the source data from at least one of the data providers being provided to the at least one of the 2D display surfaces;

subscribing, by the processor circuitry, to the at least one of the 2D display surfaces;

upon detecting an update to a subscribed 2D display surface, rendering the at least one subscribed 2D display surface as the single image by performing the at least one visual transformation operation on the at least one subscribed 2D display surface when the subscribed 2D display surface is positioned at the lesser depth, and choosing the single image; and displaying, by at least one display device, the single image.

12. The method of claim 11, wherein the publishing the update includes at least one of creating, destroying, and changing properties of the at least one 2D display surface within the composition space.

13. The method of claim 11, wherein the publishing the update includes updating graphic data of the at least one of the 2D display surfaces based on the source data from the at least one of the data providers, and the graphic data is updated independently from properties of the at least one 2D display surface.

14. The method of claim 11, wherein the at least one visual transformation operation includes one or more of applying initial placement and dimension to selected ones of the 2D display surfaces, compositing the selected ones of the 2D display surfaces, clipping the selected ones of the 2D display surface, rendering graphic data in the selected ones of the 2D display surfaces based on a stencil, blending pixels in a graphic image based on a blend transformation, substituting color values of a graphic image based on a color mapping, scaling the selected ones of the 2D display surfaces, rotating the selected ones of the 2D display surfaces, and/or compressing or decompressing the selected ones of the 2D display surfaces.

15. The method of claim 11, wherein the maintaining the composition space further includes that the depth direction of the composition space includes a front surface and a rear surface, with the 2D display surfaces located at positions between the front surface and the rear surface, and the rendering of the at least one subscribed 2D display surface further includes that frontward surfaces of the 2D display surfaces, which are toward the front surface, supersede rearward surfaces of the 2D display surfaces, which are toward the rear surface having greater depths in the depth direction than the frontward surfaces, and rendering the at least one subscribed 2D display surface as the single image without performing the at least one visual transformation operation on the at least one subscribed 2D display surface when the subscribed 2D display surface is positioned at the greater depth than the transformation operator surface.

16. The method of claim 15, wherein the maintaining the composition space further includes that the at least one transformation operator surface is a 2D surface of operators, and the method further comprises applying the operators as transformation functions to the 2D display surfaces that are frontward of the 2D surface of operators at the intersection of the 2D surface of operators and the forward 2D display surfaces.

17. The method of claim 16, wherein the maintaining the composition space further includes the composition space includes a plurality of 2D operator surfaces, and the method further comprises applying a selected combination of the plurality of 2D operator surfaces as a combination of transformation functions to 2D display surfaces forward of the combination of the plurality of 2D operator surfaces.

18. A method rendering, as a single image, source data from a network of data providers, wherein the method is performed in a system having processing circuitry and a memory, the method comprising:

maintaining, in the memory, a composition space containing two-dimensional (2D) display surfaces to which the source data is provided from the data providers, and at least one transformation operator surface located at a different position in a depth direction than the 2D display surfaces, the at least one transformation operator surface representing a respective visual transformation operation on 2D display surfaces positioned at lesser depths than the transformation operator surface;

publishing, to subscribers by the processor circuitry, an update to at least one of the 2D display surfaces within the composition space, the update including the source data from at least one of the data providers being provided to the at least one of the 2D display surfaces;

subscribing, by the processor circuitry, to the at least one of the 2D display surfaces;

upon detecting an update to a subscribed 2D display surface, rendering the at least one subscribed 2D display surface as the single image by performing the at least one visual transformation operation on the at least one 2D display surface and choosing the single image; and displaying, by at least one display device, the single image, wherein the publishing, to the subscribers, the update including the source data from the at least one of the data providers further includes receiving from the at least one of the data providers source data of a respective data type, the data types received from the data providers include one or more of text, vector graphics, byte stream, compressed or uncompressed video, medical device data, time series, waveform, electronic patient records, vital-signs, detecting a respective data type of the source data received from at least one of the data providers, the respective data type being one of the one or more data types, and rendering a part of the source data to the subscribed 2D display surface into an image by converting the respective data type of the source data into a data type of the image.

19. The method of claim 18, wherein the publishing, to subscribers, the update including the source data from the at least one of the data providers further includes receiving the source data of the respective data type in a respective predefined format obtained from an instrument source, and rendering the part of the source data to the subscribed 2D display surface into the image by converting the source data in the respective predefined format into the data type of the image.

20. A non-transitory computer readable storage medium storing program instructions, which when executed by a system having processing circuitry performs a method for rendering, as a single image, source data from a network of data providers, the method comprising:

maintaining, in the storage medium, a composition space containing two-dimensional (2D) display surfaces to which the source data is provided from the data providers, and at least one transformation operator surface located at a different position in a depth direction than the 2D display surfaces, wherein the at least one transformation operator surface represents a respective visual transformation operation on 2D display surfaces positioned at lesser depths than the transformation operator surface, wherein at least one of the 2D display surfaces is positioned at a greater depth than the transformation operator surface, and not subject to the visual transformation operation;

publishing, to subscribers, an update to at least one of the 2D display surfaces within the composition space, the update including the source data from at least one of the data providers being provided to the at least one of the 2D display surfaces;

subscribing to the at least one of the 2D display surfaces;

upon detecting an update to a subscribed 2D display surface, rendering the at least one subscribed 2D display surface as the single image by performing the at least one visual transformation operation on the at least one subscribed 2D display surface when the subscribed 2D display surface is positioned at the lesser depth, and choosing the single image; and displaying, by at least one display device, the single image.

* * * * *

UNITED STATES PATENT AND TRADEMARK OFFICE
CERTIFICATE OF CORRECTION

| | | |
|---|---|---|
| PATENT NO. | : 11,107,445 B2 | Page 1 of 1 |
| APPLICATION NO. | : 16/570731 | |
| DATED | : August 31, 2021 | |
| INVENTOR(S) | : James Begelman et al. | |

It is certified that error appears in the above-identified patent and that said Letters Patent is hereby corrected as shown below:

On the Title Page

Item (71), the Applicant is incorrect. Item (71) should read:
-- (71) Applicant: CANON MEDICAL SYSTEMS CORPORATION, Otawara (JP) --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*